(12) United States Patent
Lewis

(10) Patent No.: US 9,477,888 B1
(45) Date of Patent: Oct. 25, 2016

(54) PROVIDING COMPUTER-BASED INSTRUCTIONS WITHOUT DISPLAYS

(71) Applicant: Amazon Technologies, Inc., Reno, NV (US)

(72) Inventor: Kimberly Anne Lewis, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 59 days.

(21) Appl. No.: 14/227,667

(22) Filed: Mar. 27, 2014

(51) Int. Cl.
| | |
|---|---|
| *G09G 5/00* | (2006.01) |
| *G02B 27/01* | (2006.01) |
| *G06Q 10/08* | (2012.01) |
| *G06K 9/00* | (2006.01) |
| *G06T 11/60* | (2006.01) |
| *G06Q 30/02* | (2012.01) |
| *G06F 3/01* | (2006.01) |
| *G06F 1/16* | (2006.01) |
| *G06Q 30/06* | (2012.01) |

(52) U.S. Cl.
CPC ........... *G06K 9/00671* (2013.01); *G06T 11/60* (2013.01); *G02B 27/017* (2013.01); *G02B 2027/0123* (2013.01); *G02B 2027/0127* (2013.01); *G02B 2027/0178* (2013.01); *G06F 1/163* (2013.01); *G06F 3/011* (2013.01); *G06F 3/013* (2013.01); *G06F 3/017* (2013.01); *G06Q 10/083* (2013.01); *G06Q 10/0835* (2013.01); *G06Q 10/08355* (2013.01); *G06Q 30/02* (2013.01); *G06Q 30/0639* (2013.01)

(58) Field of Classification Search
CPC ............. G02B 2027/0123; G02B 2027/0127; G02B 2027/0178; G02B 27/017; G06F 1/163; G06F 3/011; G06F 3/013; G06F 3/017; G06Q 10/083; G06Q 10/08355; G06Q 10/0835; G06Q 30/0639; G06Q 30/02; G06Q 10/08
USPC ............ 345/8, 633; 359/630; 705/26.9, 340, 705/338
See application file for complete search history.

(56) References Cited

U.S. PATENT DOCUMENTS

| | | | | |
|---|---|---|---|---|
| 7,689,465 B1* | 3/2010 | Shakes | .................... | G06Q 10/08 705/27.1 |
| 8,326,679 B1* | 12/2012 | Rowe | ..................... | G06Q 10/08 705/26.2 |
| 2008/0301009 A1* | 12/2008 | Plaster | ................... | G06Q 30/06 705/28 |
| 2013/0278631 A1* | 10/2013 | Border | ................. | G02B 27/017 345/633 |
| 2015/0073936 A1* | 3/2015 | Peterson | ............ | G06Q 30/0639 705/26.9 |
| 2015/0081587 A1* | 3/2015 | Gillen | ............. | G06Q 10/08355 705/338 |
| 2015/0100514 A1* | 4/2015 | Parris | ................. | G06Q 10/0837 705/340 |

\* cited by examiner

*Primary Examiner* — Jin-Cheng Wang
(74) *Attorney, Agent, or Firm* — Athorus, PLLC

(57) ABSTRACT

Computer-based instructions for performing a task may be provided to workers using system components that display such instructions in a convenient manner and location that permit the workers to perform the task without diverting their attention from their workstations. Such instructions may be projected onto all or a portion of a surface of the workstation, or onto a lens or other optical element of a wearable computer device, thereby enabling the worker to maintain his or her focus on the task at hand, rather than having to look away at a mounted computer monitor or printed text in order to receive the instructions.

22 Claims, 16 Drawing Sheets

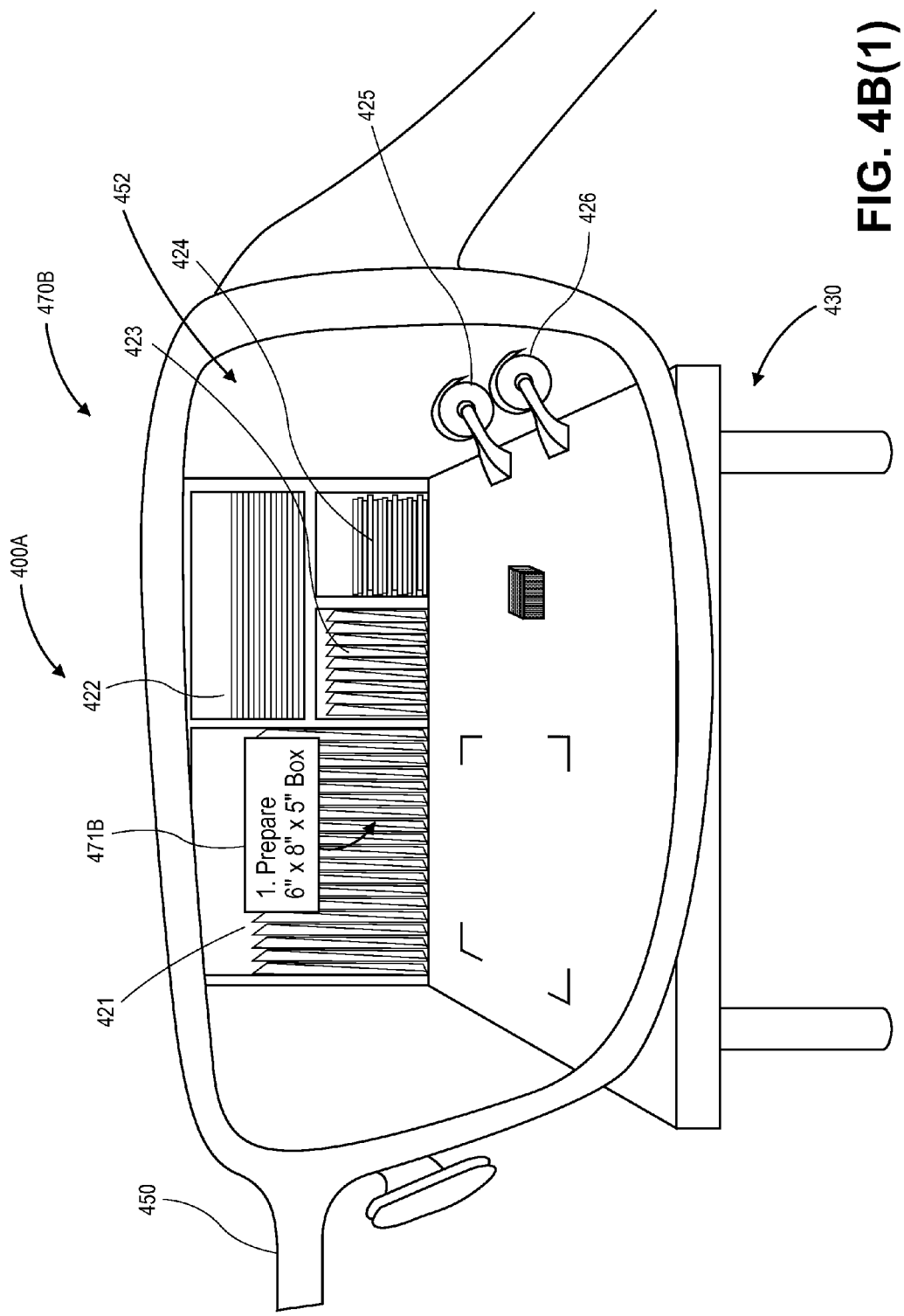
FIG. 4B(1)

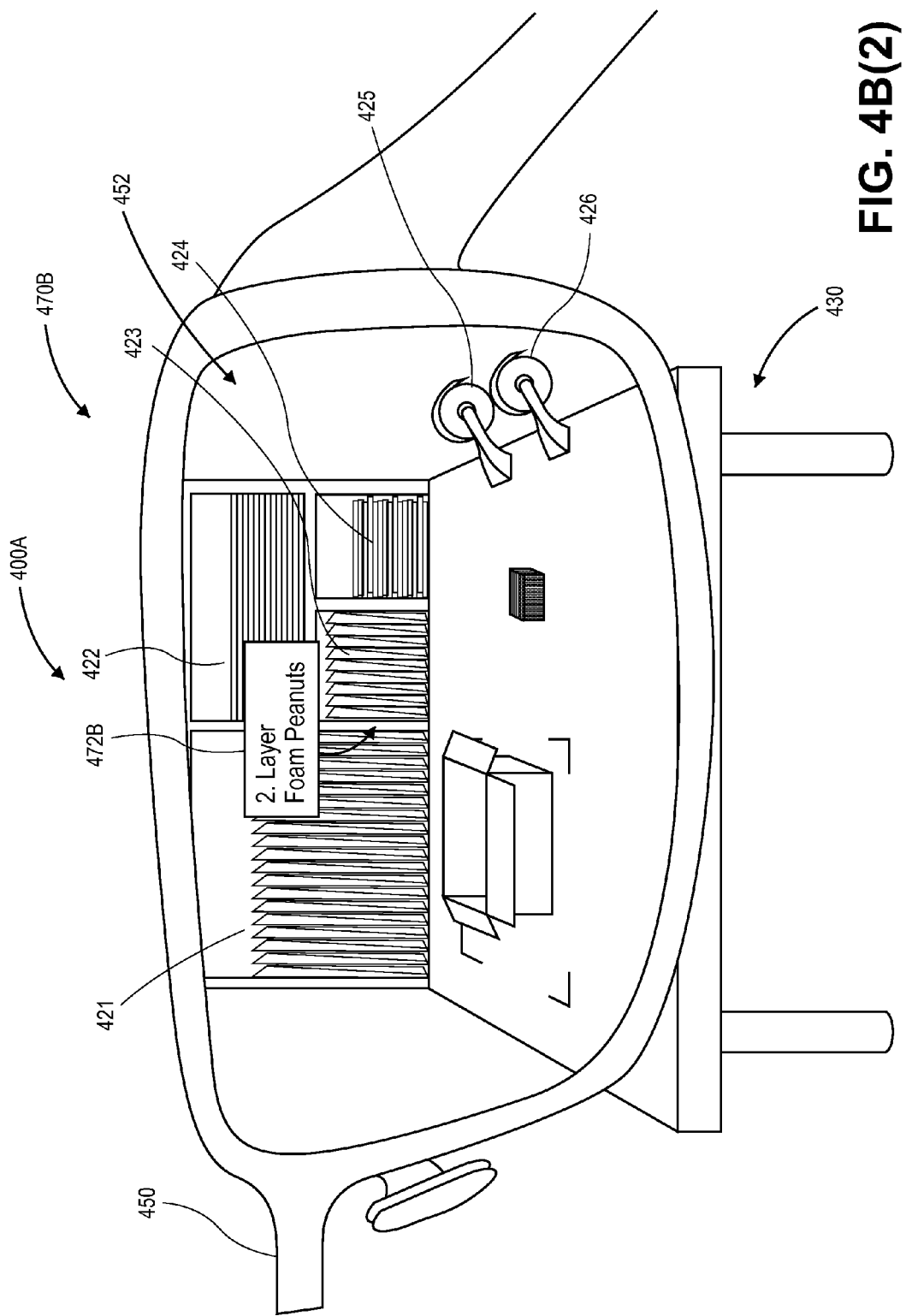
FIG. 4B(2)

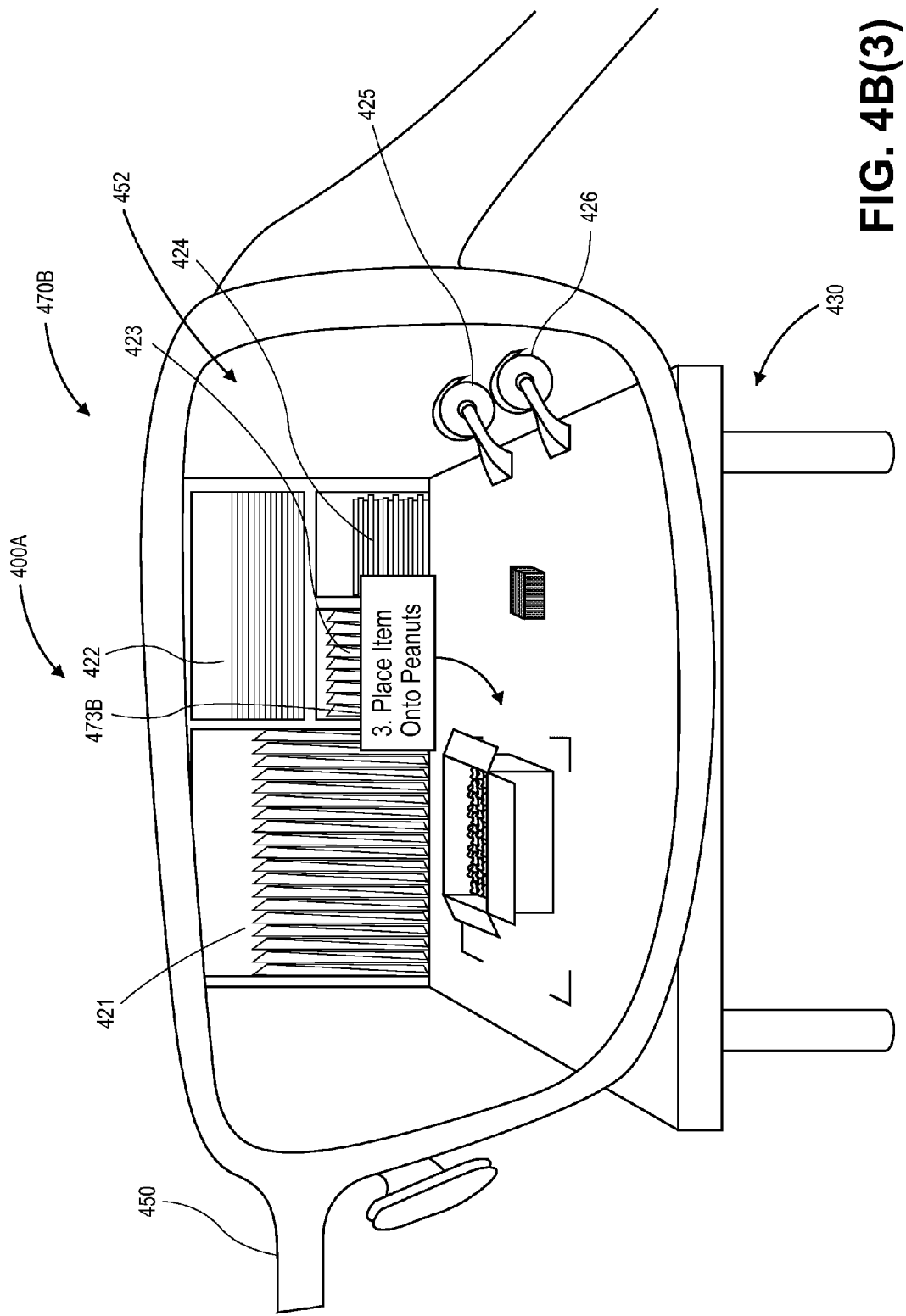
FIG. 4B(3)

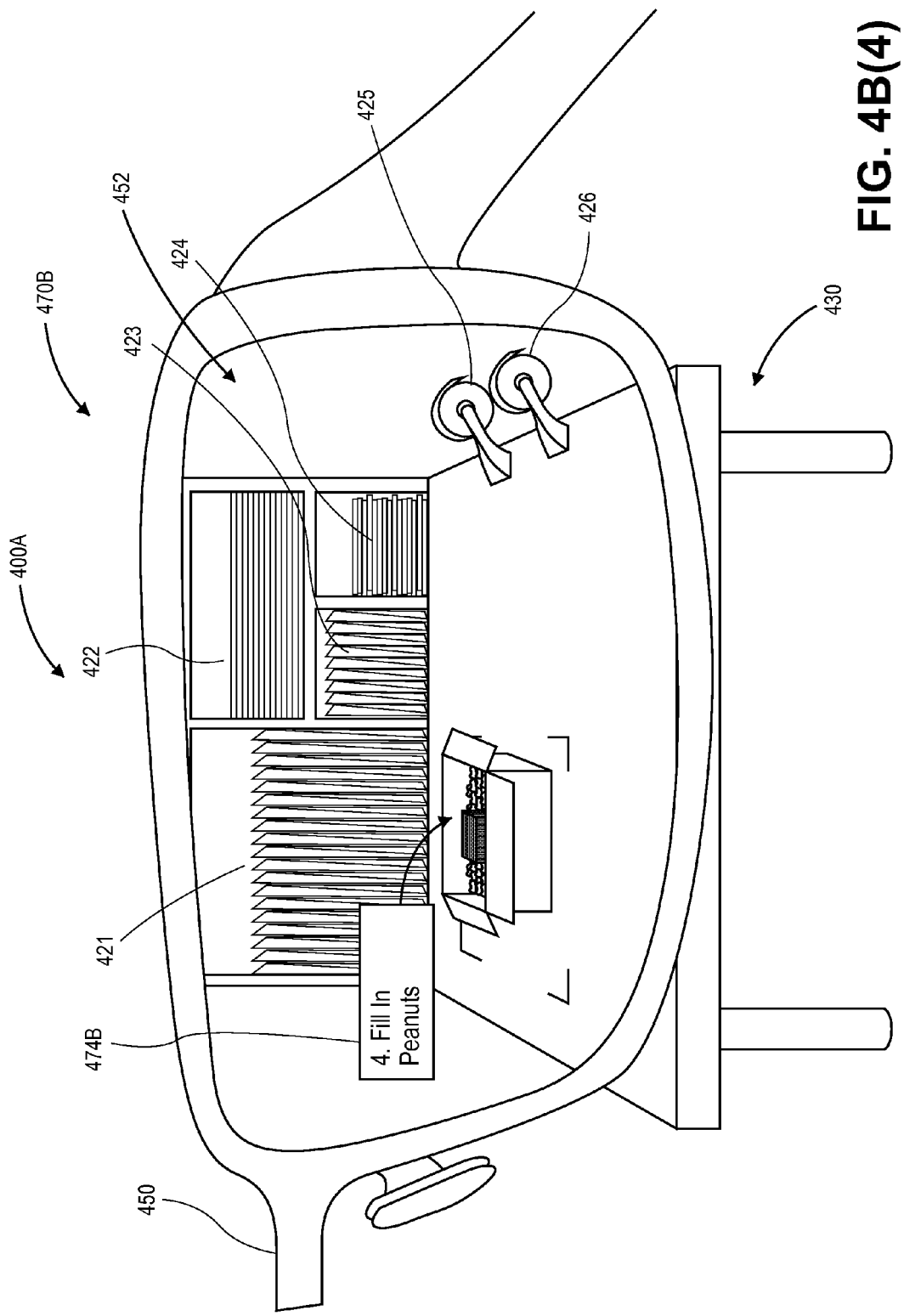
FIG. 4B(4)

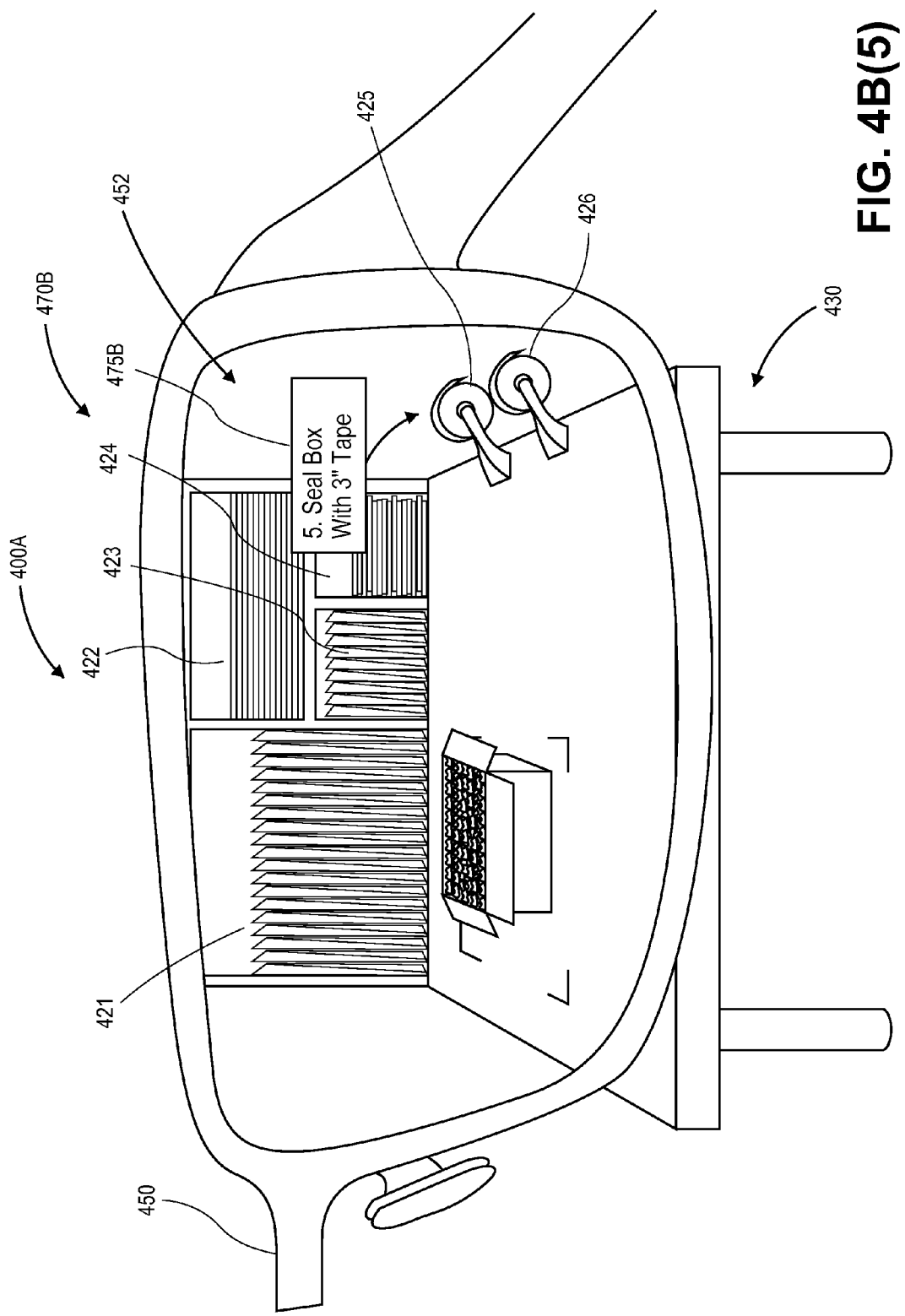
FIG. 4B(5)

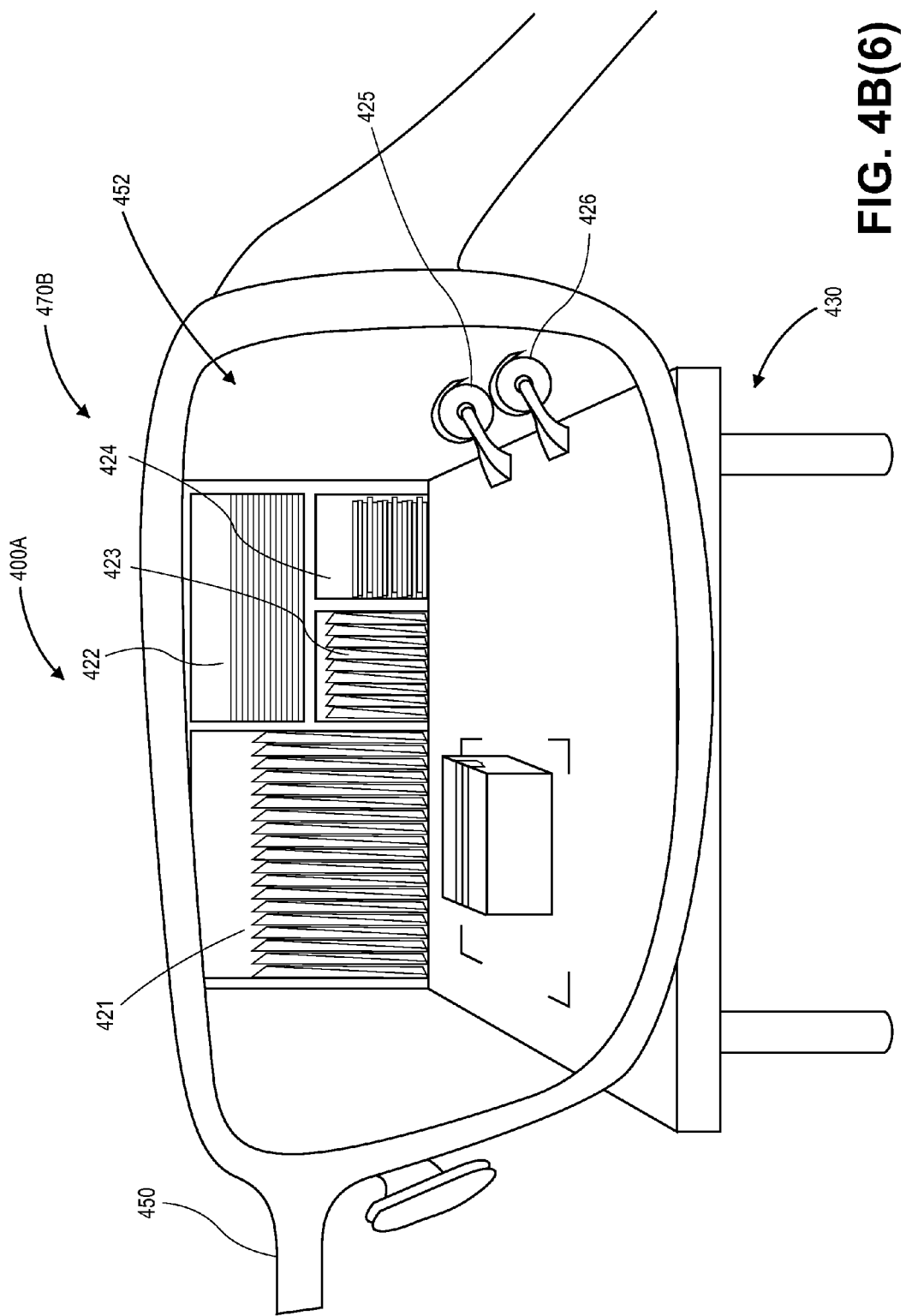
FIG. 4B(6)

PROVIDING COMPUTER-BASED INSTRUCTIONS WITHOUT DISPLAYS

BACKGROUND

When an order for an item is received at a distribution facility, such as a fulfillment center associated with an online marketplace, the item may be retrieved from a storage region and prepared for delivery to an intended recipient, such as a customer. Typically, ordered items may be prepared for delivery at a specified location, e.g., a preparation station, which may include one or more types of containers, dunnage and/or other supplies for preparing the item for delivery. Additionally, instructions for preparing the item for delivery to the customer may be provided to a worker or other staff member by a computer and an associated display monitor or screen, which may present the instructions for preparing the item in a serial list, in a vicinity of a table or other workstation.

Today, customers may order items of nearly any number or type from an online marketplace. Accordingly, preparing such items for delivery to a customer may require a worker or other staff member to perform a number of unique or varying steps according to a complex or lengthy set of instructions. Therefore, the worker or other staff member typically must shift his or her eyes back and forth between the computer or computer display that provides such instructions and the items or the resources required to properly prepare the items for delivery when performing the task at hand. Depending on a level of complexity of an order or the specific components or requirements of the items included in the order, the worker's change in focus may create the potential for one or more errors in the preparation of the item, which may increase the costs of delivery or the risk that the items will not arrive in a suitable condition.

BRIEF DESCRIPTION OF THE DRAWINGS

FIGS. 4A, 4B(1), 4B(2), 4B(3), 4B(4), 4B(5) and 4B(6) are views of systems for providing computer-based instructions, in accordance with embodiments of the present disclosure.

DETAILED DESCRIPTION

As is set forth in greater detail below, the present disclosure is directed to systems and methods for providing computer-based instructions without the use of standard computer displays. Specifically, the systems and methods disclosed herein are directed to recognizing or acknowledging one or more items that are to be prepared for delivery at a workstation; identifying instructions for preparing such items for delivery; and displaying the instructions in convenient and unobtrusive locations or positions in a manner that enables a worker or other staff member to prepare the items for delivery without diverting his or her attention from the task at hand. The instructions may be identified based on any applicable shipping requirements or constraints for the item, which may be defined according to one or more attributes of the item, including but not limited to dimensions (e.g., lengths, widths, heights, surface areas, volumes or shapes associated with the item), masses, sources (e.g., a particular vendor, manufacturer or seller of the item, or a city, state, region or country from which the item originated) or destinations (e.g., a particular customer or recipient of the item, or a city, state, region or country to which the item is to be delivered), as well as the locations of any necessary and/or suitable containers, dunnage or other resources for preparing the items with respect to the workstation.

Figure 1A:
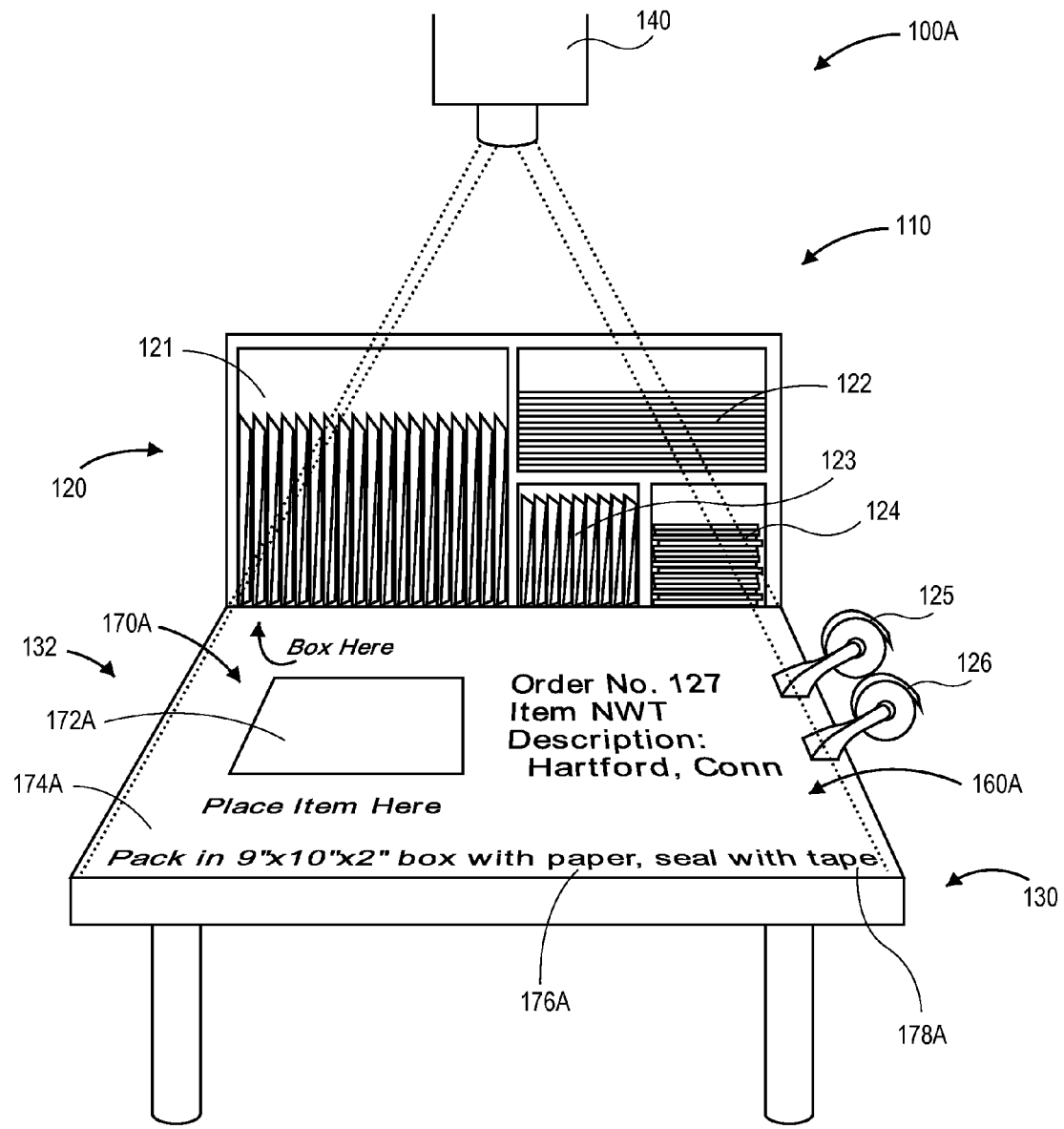
FIGS. 1A and 1B are systems for providing computer-based instructions, in accordance with embodiments of the present disclosure.
Figure 1B:
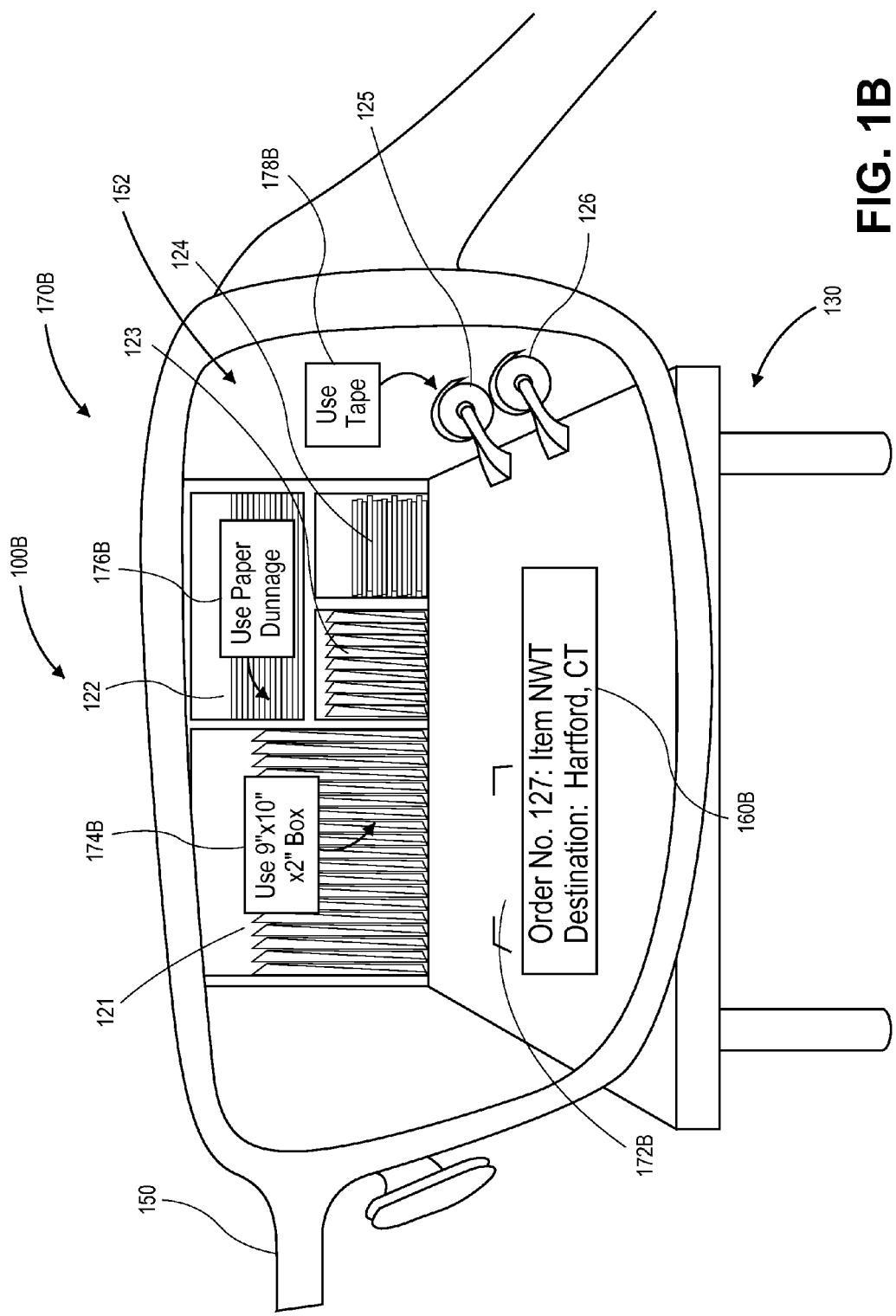

Exemplary systems 100A, 100B for providing computer-based instructions in accordance with the present disclosure are shown in FIGS. 1A and 1B. Referring to FIG. 1A, one system 100A includes a workstation 110 having a supply frame 120, a working table 130 and a projector 140 configured above the working table 130. The supply frame 120 includes a plurality of bins 121, 122, 123, 124 for including containers such as boxes, envelopes, tubes or bags or dunnage such as paper, plastic, foam materials or "bubble wrap," as well as mounts 125, 126 for providing supplies such as rolled adhesive tapes or mailing labels. The projector 140 is oriented to project information 160 and a set of visual instructions 170A onto an upper surface 132 of the working table 130. The information 160A identifies an order and an item to be prepared for delivery, and a destination for the order or the item. The set of visual instructions 170A includes a reference 172A to a location where the item should be placed during preparation, a reference 174A to a container for delivering the item, a reference 176A to a type of dunnage to be included in the container with the item, and a reference 178A to a means for securing the container.

According to the systems and methods of the present disclosure, an item that is to be prepared for delivery at the workstation 110 may be identified, such as by scanning or reading a marking, label or other identifier (e.g., a set of text, numerals or other character) on an external surface of the item, by recognizing a tote, cart or bin in which the item arrives, or by receiving a message regarding the item or an order with which the item is associated at the workstation 110. Information regarding the item or the order with which the item is associated, a destination for the item, or any particular handling requirements or constraints for the item (e.g., whether the item requires a specific container or type of dunnage, whether the item includes hazardous materials or is fragile, or whether the item must pass through customs during transit) may be obtained. Likewise, information regarding the workstation 110, including the locations and numbers or amounts of supplies that are locally available, may also be obtained. Based on the information regarding the item and the workstation 110, a set of visual instructions 170A for preparing the item may be identified and displayed onto at least a portion of a table or other working surface 130 at the workstation 110, along with information 160 regarding the item. Accordingly, the worker may prepare the item for delivery at the workstation 110 without having to look away from the working surface 130 by simply following the instructions presented thereon.

Referring to FIG. 1B, another exemplary system 100B includes the workstation 110 of FIG. 1A, as viewed through an augmented reality device 150, such as a wearable computer device having an optical head-mounted display, having an optical element 152 (e.g., a lens). As is shown in FIG. 1B, window 160B including information regarding an item is shown as projected upon the optical element 152 within a field of view of a user of the augmented reality device 150, and a set of visual instructions 170B is also provided within windows 172B, 174B, 176B, 178B that are projected upon the optical element 152.

Accordingly, the systems and methods of the present disclosure, including but not limited to the systems 100A, 100B of FIGS. 1A and 1B, may be used to provide computer-based information and/or instructions to a worker for the preparation or delivery of an item, or for the performance of any other task, by presenting the information in a convenient, hands-free format that permits the worker to complete the task in an efficient manner and without having to divert his or her attention or otherwise look away from the work being performed.

Within a modern fulfillment center environment, items that have been ordered by customers are typically delivered to customers according to one or more general methods. For example, an ordered item may be retrieved from a designated storage location and placed into a bin, cart, tote or other vehicle for transporting the ordered item to a workstation where the item is to be prepared for delivery. Upon an arrival of the ordered item at the workstation, the item may be recognized by one or more manual or automatic means, such as by scanning or reading an external marking, label or other identifier on an outer surface of the item, by recognizing a data transfer device associated with the item or the vehicle in which it is transported (e.g., a radio-frequency identification, or "RFID," device), or by determining a mass of the item. Once the ordered item has been identified, a set of instructions for preparing the ordered item for delivery may be displayed to a worker on at least one monitor or other computer display. The instructions for preparing the ordered item that are provided to the worker may be of any kind or form. For example, the instructions may identify a container (e.g., a box, a bag, a tube, an envelope) into which the ordered item is to be placed, along with an amount and type of dunnage (e.g., paper, plastic, foam materials or "bubble wrap"), a means of transit by which the container is to be delivered (e.g., by way of a common carrier, the United States Postal Service, or a customized or specialized means of transit), as well as a destination for the container. Additionally, the instructions may be intrinsic to the ordered item itself. For example, an instruction may direct a worker to activate an electronic device (e.g., a smartphone, tablet computer or satellite radio device), to affix a warning label or decal on heavy or large items, to include a gift card or order description (e.g., packing slip) in a container with the ordered item, or to take any other specific action based on one or more attributes of the ordered item.

The monitors or computer displays onto which instructions for performing a task, such as the preparation of an item for delivery, may be displayed are typically standard computer displays such as cathode ray tube ("CRT") displays, light-emitting diode ("LED") or organic light-emitting diode ("OLED") displays, liquid crystal displays ("LCD"), or plasma displays that are mounted to a wall, ceiling or other structure in a vicinity of the workstation. While such displays may effectively present a large amount of information and instructions to one or more workers, the mounted locations of such displays typically force the workers to alternate their focus between the displays and the physical environment in which they are performing a task. When faced with pressure to complete a task quickly, a worker may skip or repeat one or more of the displayed instructions, or may ignore the displayed instructions entirely, and instead elect to complete the task by rote or on the fly. Such factors tend to increase the risk that the task will be completed ineffectively.

Moreover, where a task requires a worker to locate one or more resources (e.g., a container into which an item is to be packed, or dunnage to accompany an item), instructions that are displayed on a monitor are typically unhelpful in assisting the worker in locating such resources. For example, where a fulfillment center environment includes a variety of containers into which items may be packed, displaying an instruction such as "Pack Item into a Box 1AF" to a worker is not particularly helpful unless the worker knows where the container may be located. Although further instructions regarding the location of the container may be provided, such as "Pack Item into a Box 1AF, Located in Bin 326 on Shelf 916 Adjacent to Bag BSF and Tube DCV," such instructions only add to the length of time required to perform the task in accordance and also increase the risk that the task will be performed unsatisfactorily. Moreover, in a fulfillment center environment in which dozens or even hundreds of containers, types of dunnage or other packing supplies are available for packing items, training a customer where to locate each of the containers, types of dunnage or other packing supplies may be challenging, and will require an unnecessarily steep learning curve.

The systems and methods of the present disclosure are directed to effectively providing computer-based instructions for performing a task to a worker in convenient or unobtrusive locations or positions with respect to the task to be performed. In particular, according to some embodiments of the present disclosure, such instructions may be projected upon one or more working surfaces associated with the performance of the task, such as by the projector 140 of the system 100A of FIG. 1A, or displayed by a wearable computer device having an optical head-mounted display, such as the augmented reality device 150 of the system 100B of FIG. 1B. In this regard, and as is shown in FIGS. 1A and 1B, the computer-based instructions may be provided to the worker in a manner that does not hinder, and instead enhances, the performance of the task by the worker.

According to some embodiments of the present disclosure, a system for providing computer-based instructions may generate a record or index of geographic locations of resources that are required in order to prepare items for delivery to a customer, and store the record or index in at least one data store. Such a record or index may indicate the locations of any containers (e.g., boxes, envelopes, tubes or bags), dunnage (e.g., paper, plastic, foam materials or "bubble wrap"), labels (e.g., address labels, shipping labels or postage labels such as stamps) or any other accessories required in order to prepare an item for delivery, including but not limited to adhesive tapes, glues, sealants or the like, in actual or relative terms with respect to the workstation. The system may then recognize an item at the workstation, or an order in which the item is included, such as by scanning or reading a marking, label or other identifier on an external surface of the item, or, alternatively, on a vessel or vehicle in which the item was delivered to the workstation, or by any other means by which items or orders may be recognized.

Once the item, or the order in which the item is included, has been recognized, the system may then obtain a set of shipping requirements or constraints for the item, e.g., in a database or other data store. Such requirements or constraints may be based on the attributes, contents or characteristics of the item or the order, or on any other factor. Next, the system may generate a set of instructions for the preparation of the item for delivery based on the shipping requirements or constraints for the item or the order, as well as the availability of the resources that are required to prepare the item or the order for delivery, and display the set of instructions to a worker.

According to some other embodiments of the present disclosure, the set of instructions may be displayed by a system that includes a projector device, which may be oriented or configured to project one or more images including one or more of a set of instructions to specific locations on a surface proximate to or within a workstation. For example, the set of instructions may be presented to a worker upon appropriate portions of a table or other surface associated with a workstation, such that the instructions appear within a field of view of the worker in one or more designated regions, i.e., virtually identifying or pointing to virtually identifying or pointing to specific containers, dunnage and/or other materials that may be required in order to prepare the item for delivery. The instructions may also be provided individually or in series, and the completion of one or more of the instructions may be acknowledged by the system by any means, such as by visually recognizing one or more indicators as to the performance of such tasks, or by transmitting a signal (e.g., through a computer-based pointing device or any other means) to the system.

According to still other embodiments of the present disclosure, the set of instructions may be displayed by a system that includes an augmented reality device, such as a wearable computer device having an optical head-mounted display. For example, the set of instructions may be presented to a worker wearing the augmented reality device by projecting the instructions onto a lens, optical element or other eye-level feature that causes the instructions to appear within a field of view of the worker in one or more windows or designated regions, i.e., virtually identifying or pointing to specific containers, dunnage and/or other materials that may be required in order to prepare the item for delivery. The instructions may also be provided individually or in series, and the completion of one or more of the instructions may be acknowledged by the system by any means, such as by the performance of one or more recognizable gestures, e.g., through one or more nods, dips, shakes or turns of the head, by scanning or reading a dedicated marking, label or identifier, or by manual contact with one or more elements, which may be received by the system.

Figure 2A:
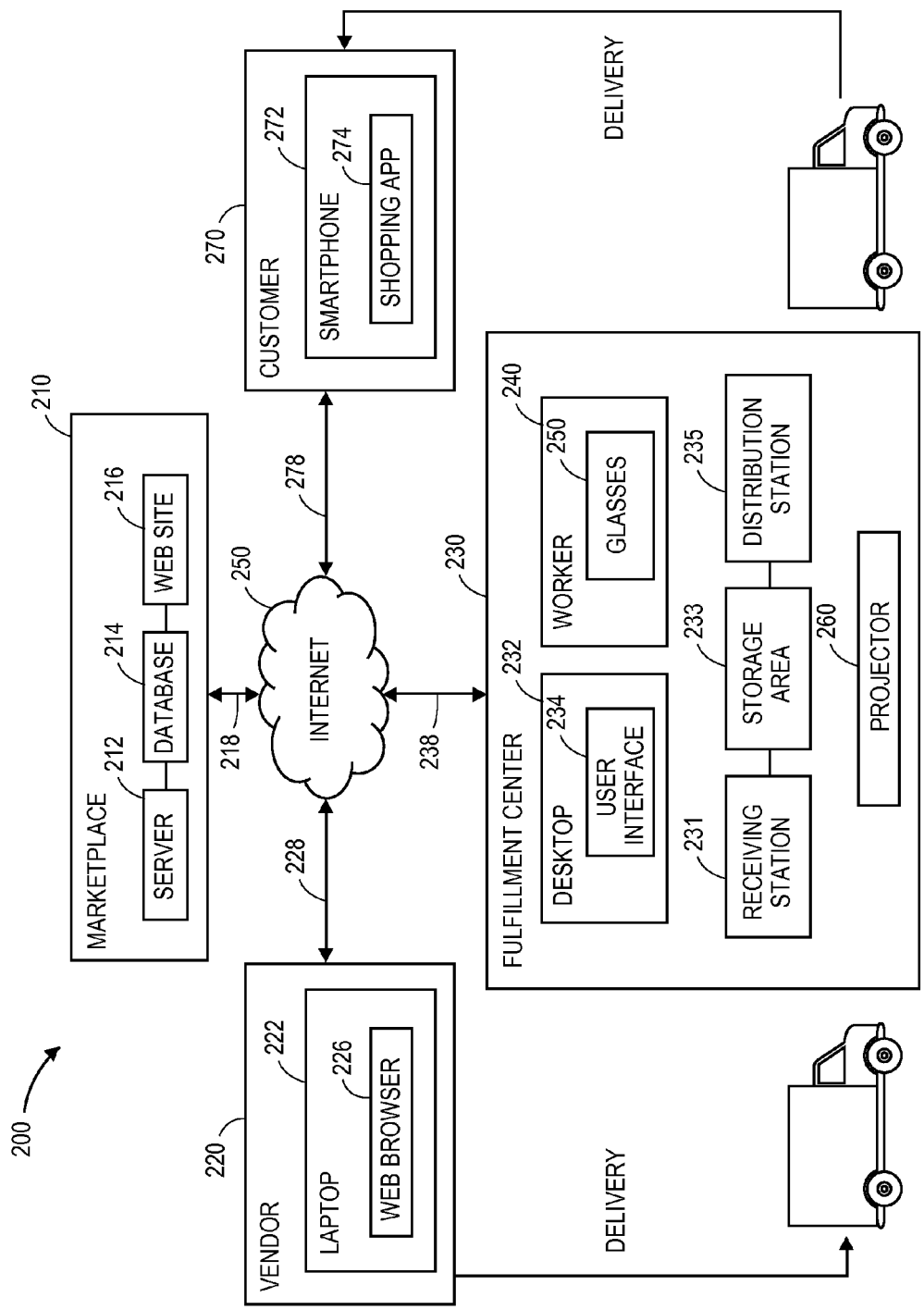
FIGS. 2A and 2B are block diagrams of components of systems for providing computer-based instructions, in accordance with embodiments of the present disclosure.
Figure 2B:
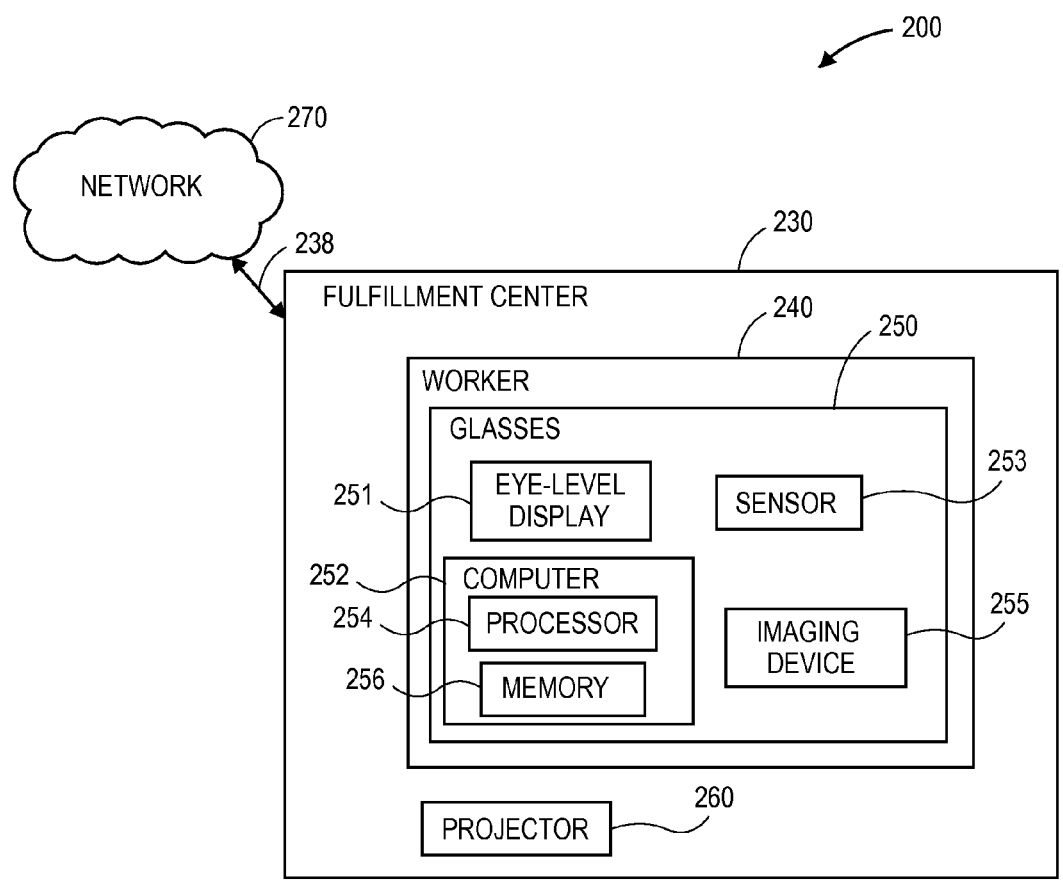

Referring to FIGS. 2A and 2B, a block diagram of one system 200 for providing computer-based instructions is shown. The system 200 includes a marketplace 210, a vendor 220, a fulfillment center 230 and a customer 270 that are connected to one another across a network 280, such as the Internet. The system 200 further includes a worker 240 who is associated with the fulfillment center 230 and is wearing a pair of augmented reality glasses 250.

The marketplace 210 may be any entity or individual that wishes to make items from a variety of sources available for download, purchase, rent, lease or borrowing by customers using a networked computer infrastructure, including one or more physical computer servers 212 and databases 214 for hosting a web site 216. The marketplace 210 may be physically or virtually associated with one or more storage or distribution facilities, such as the fulfillment center 230. The web site 216 may be implemented using the one or more servers 212, which connect or otherwise communicate with the one or more databases 214 as well as the network 280, as indicated by line 218, through the sending and receiving of digital data. Moreover, the database 214 may include any type of information regarding items that have been made available for sale through the marketplace 210, or ordered by customers from the marketplace 210.

The vendor 220 may be any entity or individual that wishes to make one or more items available to customers, such as the customer 270, by way of the marketplace 210. The vendor 220 may operate one or more order processing and/or communication systems using a computing device such as a laptop computer 222 and/or software applications such as a web browser 226, which may be implemented through one or more computing machines that may be connected to the network 280, as is indicated by line 228, in order to transmit or receive information regarding one or more items to be made available at the marketplace 210, in the form of digital or analog data, or for any other purpose.

The vendor 220 may deliver one or more items to one or more designated facilities maintained by or on behalf of the marketplace 210, such as the fulfillment center 230. Additionally, the vendor 220 may receive one or more items from other vendors, manufacturers or sellers (not shown), and may deliver one or more of such items to locations designated by the marketplace 210, such as the fulfillment center 230, for fulfillment and distribution to customers. Furthermore, the vendor 220 may perform multiple functions. For example, the vendor 220 may also be a manufacturer and/or a seller of one or more other items, and may offer items for purchase by customers at venues (not shown) other than the marketplace 210. Additionally, items that are made available at the marketplace 210 or ordered therefrom by customers may be made by or obtained from one or more third party sources, other than the vendor 220, or from any other source (not shown). Moreover, the marketplace 210 itself may be a vendor, a seller or a manufacturer.

The fulfillment center 230 may be any facility that is adapted to receive, store, process and/or distribute items. As is shown in FIG. 2A, the fulfillment center 230 includes a desktop computer 232, as well as stations for receiving, storing and distributing items to customers, including but not limited to a receiving station 231, a storage area 233 and a distribution station 235. The fulfillment center 230 further includes a worker 240 and a projector 260. As is also shown in FIG. 2A, the worker 240 is wearing or operating a wearable computer device such as a pair of augmented reality glasses 250.

The fulfillment center 230 may operate one or more order processing and/or communication systems using a computing device such as the desktop computer 232 and/or software applications having one or more user interfaces 234 (e.g., a browser), or through one or more other computing devices or machines that may be connected to the network 280, as is indicated by line 238, in order to transmit or receive information in the form of digital or analog data, or for any other purpose. The computer 232 may also operate or provide access to one or more reporting systems for receiving or displaying information or data regarding workflow operations, and may provide one or more interfaces, such as the user interface 234, for receiving interactions (e.g., text, numeric entries or selections) from one or more operators, users or workers in response to such information or data. The computer 232 may be a general purpose device or machine, or a dedicated device or machine that features any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

The receiving station 231 may include any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The storage area 233 may include one or more predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The distribution station 235 may include one or more regions or stations where items that have been retrieved from a designated storage area may be evaluated, prepared and packed for delivery from the fulfillment center 230 to addresses, locations or destinations specified by customers, also by way of carriers such as cars, trucks, trailers, freight cars, container ships or cargo aircraft (e.g., manned aircraft or unmanned aircraft, such as drones). Those of ordinary skill in the pertinent art will recognize that shipments of items arriving at the receiving station 231 may be processed, and the items placed into storage within the storage areas 233 or, alternatively, transferred directly to the distribution station 235, or "cross-docked," for prompt delivery to one or more customers.

The fulfillment center 230 may further include one or more control systems that may generate instructions for conducting operations at one or more of the receiving station 231, the storage area 233 or the distribution station 235, as well as the glasses 250 or the projector 260. Such control systems may be associated with the computer 232 or with one or more other computing devices or machines, and may communicate with the worker 240, the glasses 250 or the projector 260 within the fulfillment center 230 by any known wired or wireless means, or with the marketplace 210, the vendor 220 or the customer 270 over the network 280, as indicated by line 238, through the sending and receiving of digital data.

Additionally, the fulfillment center 230 may include one or more systems or devices (not shown in FIG. 2A) for determining a location of one or more elements therein, such as cameras or other image recording devices. Furthermore, the fulfillment center 230 may also include one or more workers or staff members, including but not limited to the worker 240, who may handle or transport items within the fulfillment center 230. Such workers may operate one or more computing devices or machines for registering the receipt, retrieval, transportation or storage of items within the fulfillment center, such as the computer 232, or a general purpose device such a personal digital assistant, a digital media player, a smartphone, a tablet computer, a desktop computer or a laptop computer, and may include any form of input and/or output peripherals such as scanners, readers, keyboards, keypads, touchscreens or like devices.

As is shown in FIG. 2A, the worker 240 may handle or transport items within the fulfillment center 230, such as by removing the items from a car, truck, ship or aircraft, placing the items onto a crane, jack, belt or another conveying apparatus at the receiving station 231, transporting the items to a shelf, bin, rack, tier, bar, hook or other storage means within the storage area 233, retrieving the items from such a storage means within the storage area 233, transporting the items to a defined region within the distribution station 235, and preparing the items for delivery to one or more customers. According to one embodiment, the worker 240 may also transport, or "cross-dock," items directly from the receiving station 231 to the distribution station 235.

Moreover, the worker 240 may operate one or more computing devices for registering the receipt, retrieval, transportation or storage of items within the fulfillment center, such as the glasses 240 or another computer device (e.g., a handheld device) which may be a device that is specifically programmed or adapted for such purposes, or a general purpose device such a personal digital assistant, a digital media player, a smartphone, a tablet computer or a laptop computer, and may include any form of input and/or output peripherals such as scanners, readers, keyboards, keypads, touchscreens or pointing devices. The worker 240 may confirm his or her retrieval of an item, such as by using the one or more computers or other handheld devices, at any time, including when the worker 240 has obtained the item from a shelf or other storage means within the storage area 233 and placed the item into one or more containers for transportation to the distribution station 235, or when the worker 240 has retrieved the item from the one or more containers at the distribution station 235.

The projector 260 may be configured to generate and project an image onto one or more surfaces, such as a surface of or near a workstation associated with the preparation of one or more items for delivery. The projector 260 may be configured to generate and/or project full color single images or, alternatively, full motion video images based on information received from one or more computer devices, such as the server 212, the laptop 222 or the desktop computer 232. The projector 260 may comprise a liquid crystal display ("LCD") projector, a liquid crystal on silicon ("LCOS") projector, a digital light processing ("DLP") projector, a cathode ray tube ("CRT") projector, a laser projector, a laser scanning projector, a digital micromirror device, or other like devices for projecting one or more images.

The customer 270 may be any entity or individual that wishes to download, purchase, rent, lease, borrow or otherwise obtain items (which may include goods, products, services or information of any type or form) from the marketplace 210. The customer 270 may utilize one or more computing devices, such as a smartphone 272 or any other like machine that may operate or access one or more software applications, such as a web browser (not shown) or a shopping application 274, and may be connected to or otherwise communicate with the marketplace 210, the vendor 220 or the fulfillment center 230 through the network 280, as indicated by line 278, by the transmission and receipt of digital data. Moreover, the customer 270 may also receive deliveries or shipments of one or items from facilities maintained by or on behalf of the marketplace 210, such as the fulfillment center 230, or from the vendor 220.

As is shown in FIG. 2B, the worker 240 may wear or otherwise manipulate a pair of augmented reality glasses 250 including an eye-level display 251, a computer device 252, a sensor 253 and an imaging device 255. The computing device 252 includes a processor 254 and a memory 256, and may be in communication with the marketplace 210, the vendor 220 or other external components via the network 280, through the sending and receiving of digital data. The memory 256 may contain computer program instructions that the processor 254 may execute in order to implement one or more embodiments of the present disclosure, and may further include random access memory ("RAM"), read-only memory ("ROM") or any other form of persistent and/or non-transitory computer-readable media. The memory 256 may further store an operating system thereon, for the purpose of providing general administration and operation functions for the processor 254 and other components of the glasses 240, as well as other information for implementing any aspects of the present disclosure.

The eye-level display 251 may include any type or form of output device that may be positioned at or near an eye-level of the worker 240 wearing the glasses 250. The eye-level display 251 may thus include a substantially transparent display device that may be mounted or visible within a field of view of the worker 240, including but not limited to a sufficiently small monitor or a head-up display projected upon or by a lens or other optical element of the glasses 250, and may therefore project information within the field of view of the worker 240. For example, the eye-level display 251 may incorporate any of a number of active or passive display technologies, such as electronic ink, liquid crystal display (or "LCD"), LED or organic light-emitting diode (or "OLED") displays, cathode ray tubes (or "CRT"), projection screens or the like. Those of ordinary skill in the pertinent art would further realize that any other form of output device may be associated with the eye-level display 250, or may act as a substitute for the eye-level display 250.

The sensor 253 may be any form of sensing device for detecting conditions in an environment within the fulfillment center 230, and may be operatively or functionally joined with the computer 252 and one or more other components by any wired or wireless means. For example, the sensor 253 may be configured to read or interpret one or more external markings on an object, as well as to determine a distance from between the sensor 253 and the object. Some such external markings may include images, bar codes, QR codes, bokodes, characters, numbers, symbols, or colors that are located within a specific distance or depth of field of the sensor 253. Those of ordinary skill in the pertinent art will recognize that the number or type of sensors that may be provided in accordance with the present disclosure, including but not limited to cameras or other optical sensors, temperature sensors, heat sensors, radiation sensors or position and/or orientation sensors, is not limited. Those of ordinary skill in the pertinent art will also recognize that the sensor 253 may also be or include a camera.

The imaging device 255 may be any form of optical recording device mounted to or otherwise associated with the glasses 250, e.g., a digital camera that may be mounted to a frame of the glasses 250. For example, the imaging device 255 may be used to photograph or otherwise capture and record images of the structures, facilities or other elements for storing items inside the fulfillment center 230, as well as the items within the fulfillment center 230, or for any other purpose.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center," a "worker," "glasses" or a "customer," or like terms, may be automated steps performed by their respective computer systems, or implemented within software modules (or computer programs) executed by one or more general purpose computers. Moreover, process steps described as being performed by a "marketplace," a "vendor," a "fulfillment center," a "worker," "glasses" or a "customer" may be typically performed by a human operator, but could, alternatively, be performed by an automated agent.

The marketplace 210, the vendor 220, the fulfillment center 230, the worker 240, the glasses 250, the projector 260 and/or the customer 270 may use any web-enabled or Internet applications or features, or any other client-server applications or features including electronic mail (or E-mail), or other messaging techniques, to connect to the network 280 or to communicate with one another, such as through short or multimedia messaging service (SMS or MMS) text messages. For example, the glasses 250 or the glasses computer 252 may be adapted to transmit information or data in the form of synchronous or asynchronous messages to the fulfillment center 230 and/or the laptop computer 222, the desktop computer 232, the smartphone 272 or any other computer device in real time or in near-real time, or in one or more offline processes, via the network 280. Those of ordinary skill in the pertinent art would recognize that the marketplace 210, the vendor 220, the fulfillment center 230, the worker 240 or the customer 270 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the laptop computer 222, the desktop computer 232, the glasses computer 252, the projector 260 or the customer computer 272, or any other computers or control systems utilized by the marketplace 210, the vendor 220, the fulfillment center 230, the worker 240 or the customer 270 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3A:
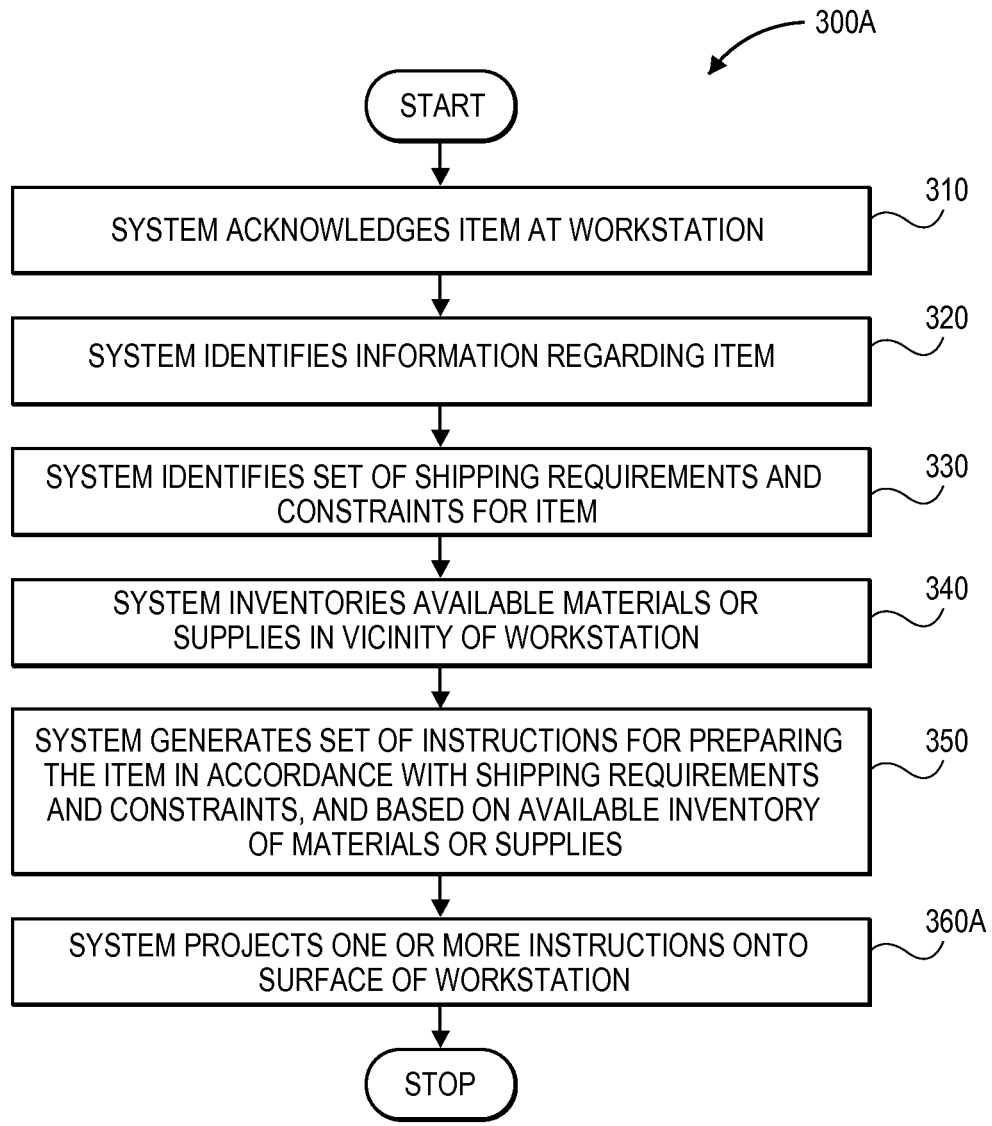
FIGS. 3A and 3B are flow charts of processes for evaluating shipments using X-ray imaging, in accordance with embodiments of the present disclosure.

As is discussed above, the systems and methods of the present disclosure are directed to presenting computer-based instructions to a user in a convenient manner, such as on one or more surfaces of a workstation. Referring to FIG. 3A, a flow chart 300A representing one embodiment of a process for evaluating shipments using X-ray imaging is shown. At box 310, a system acknowledges an item at a workstation. For example, the item may be transported to the workstation by way of a bin, cart, tote or other vehicle in order to be prepared for delivery. Upon the arrival of the item, a worker may scan one or more markings, labels or other identifiers such as images, bar codes, QR codes, bokodes, characters, numbers, symbols, or colors on the item, or on the vehicle in which the item was transported, in order to recognize and acknowledge that the item has arrived. Alternatively, an electronic message may be transmitted to or received by the workstation, indicating that the item has arrived at the workstation.

At box 320, the system identifies information regarding the item. For example, based on the recognition of the item at box 310, the system may access information regarding the item, or an order with which the item is associated, such as any information or data regarding the attributes, contents or characteristics of the item or the order, including any other items that are included in the order, as well as a destination for the item, and whether the item or the order require any form of specialized handling.

At box 330, the system identifies a set of shipping requirements or constraints for the preparation of the item. For example, based at least in part on the information identified above, the system may determine that the item requires a particular type or form of container in which an item, or other items of an order, are to be shipped. The system may also determine whether either the item or the order require a specific type, form or amount of dunnage to be included in the container. For example, a boxed item may be placed within a container along with bundled paper or foam "peanuts," while a bottled item may require one or more sealed air bags, and a fragile item (e.g., items containing glass, porcelain or other breakable materials) may require a combination of types and amounts of dunnage. Moreover, a shipment of an item to an apartment building or condominium complex may require a smaller container, or a more secure container, due to size constraints of mailboxes and many such buildings or complexes, while shipments of items to rural homes may be delivered in larger or less secure containers. Finally, the system determines an approximate area of the work station that may be required in order to properly prepare the item.

At box 340, the system inventories the preparation materials or supplies (e.g., containers, dunnage, labels or adhesives) that are available in a vicinity of the workstation. For example, referring to the workstation 110 of FIGS. 1A and 1B, the system may determine the resources that are provided in the bins 121, 122, 123, 124 or on the mounts 125, 126 and are available for preparing the item.

At box 350, the system generates a set of instructions for preparing the item in accordance with the shipping requirements and constraints, and based on the available inventory of materials or supplies. For example, the system may identify an appropriate and available container into which the item, or items of the order, may be placed, and an appropriate and available type and amount of dunnage to accompany the item or items, as well as a type or form of adhesive for preparing the item or items within the container, and a specific shipping or postage label that is to be affixed on an exterior surface of the container prior to delivery.

At box 360A, the system projects one or more of the instructions onto a surface of the workstation using a projector device, and the process ends. For example, referring to the system 100A of FIG. 1A, the projector 140 may be configured above the working table 130, and may project text or images corresponding to one or more of the instructions onto specified regions of a surface of the workstation. For example, as is shown in FIG. 1A, the instructions may include a reference 174A to a container, a reference 176A to a type of dunnage or a reference 178A to a means for securing the container and the items within the container.

Figure 3B:
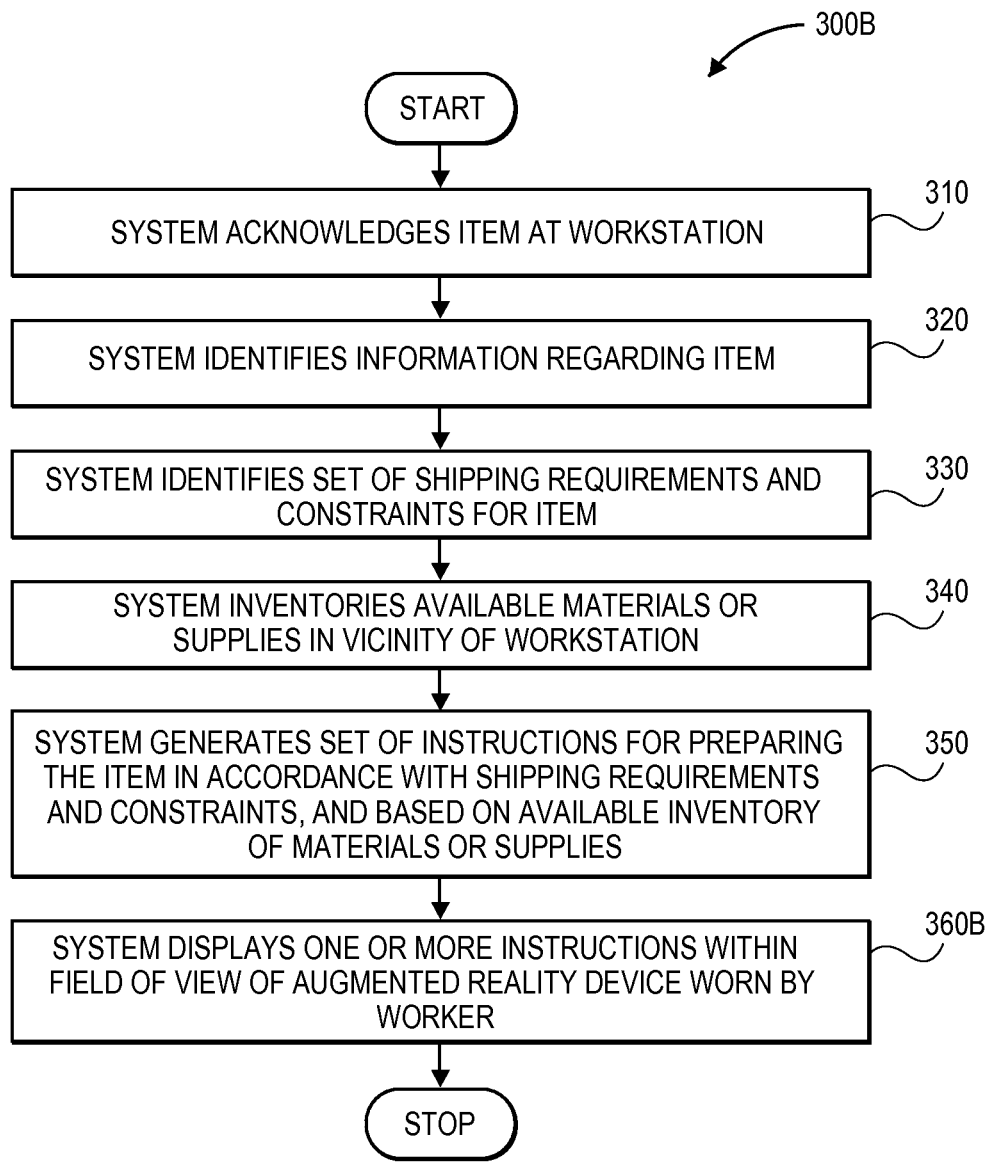

Referring to FIG. 3A, a flow chart 300B representing another embodiment of a process for evaluating shipments using X-ray imaging is shown. The process embodied in the flow chart 300B of FIG. 3B includes boxes 310, 320, 330, 340, 350 as described above with regard to FIG. 3A. At box 360B of FIG. 3B, however, the system displays one or more of the instructions in a field of view of an augmented reality device worn by the worker. For example, referring again to FIG. 3B, the system may cause the instructions to be displayed within windows, such as the windows 160B, 172B, 174B, 176B, 178B, that may be projected upon the or by optical element 152, and rendered within the field of view of the worker wearing the glasses 150.

Figure 4A:
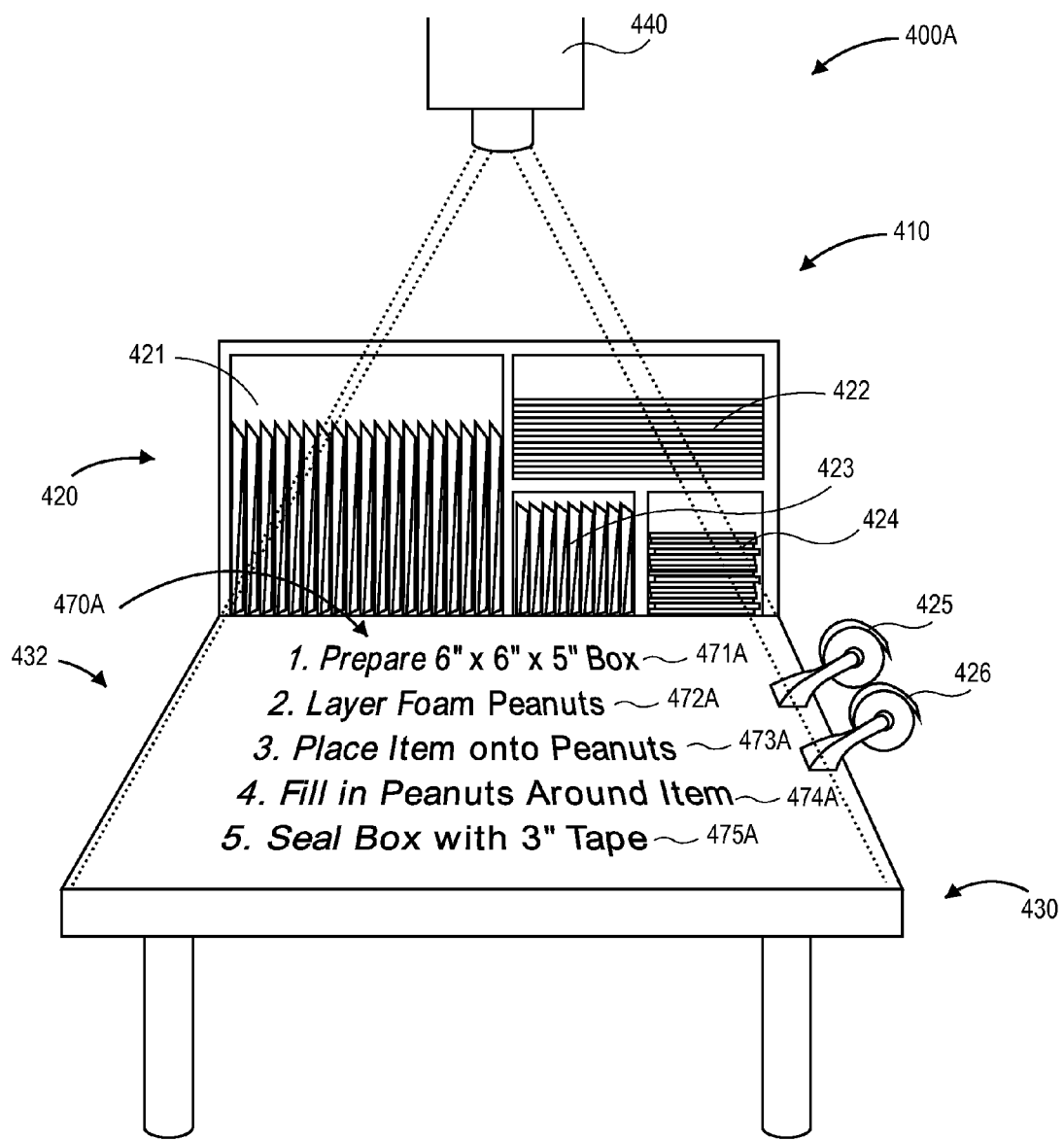

As is discussed above, in accordance with the present disclosure, computer-based instructions may be presented to a worker in groups of one or more instructions or, alternatively, in series, such that each of the instructions is displayed in a convenient location within a field of view of the worker, and at a convenient time. Referring to FIGS. 4A, 4B(1), 4B(2), 4B(3), 4B(4), 4B(5) and 4B(6), views of systems 400A, 400B for providing computer-based instructions are shown. Except where otherwise noted, reference numerals preceded by the number "4" in FIG. 4A, 4B(1), 4B(2), 4B(3), 4B(4), 4B(5) or 4B(6) indicate components or features that are similar to components or features having reference numerals preceded by the number "1" shown in FIG. 1A or FIG. 1B.

For example, some embodiments of the systems and methods of the present disclosure may provide a complete set of instructions for performing a task to a worker in one or more convenient locations or orientations at a workstation. As is shown in FIG. 4A, the system 400A includes a workstation 410 having a supply frame 420, a working table 430 and a projector 440 configured above the working table 430. The projector 440 is oriented to project a set of visual instructions 470A onto an upper surface 432 of the working table 430. The set of visual instructions 470A includes an instruction 471A regarding a container that is to be used to deliver an item, instructions 472A, 474A for placing dunnage into the container, an instruction 473A for placing the item into the container, and an instruction for sealing the container. The set of visual instructions 470A is provided on the horizontal upper surface 432 of the working table 430, such that a worker may view instructions for preparing the item for delivery in a convenient location and without having to divert his or her attention from the workstation 410. The set of visual instructions 470A may be displayed in any desired order or sequence, and in any preferred or appropriate location on the horizontal upper surface 432.

Alternatively, some other embodiments of the present disclosure may provide instructions for performing a task singly, or in small groups. As is shown in FIGS. 4B(1), 4B(2), 4B(3), 4B(4), 4B(5) and 4B(6), the system 400B includes the workstation 410 of FIG. 4A, as viewed through an augmented reality device 450, such as a wearable computer device having an optical head-mounted display, including an optical element 452. The augmented reality device 450 is oriented to project a set of visual instructions 470b to a worker onto the optical element 452, one at a time, as the worker performs the task. Specifically, as is shown in FIG. 4B(1), window 471B includes an instruction for preparing a container to receive an item and dunnage, and identifies a location at the workstation 410 where the materials for preparing the container are located. As is shown in FIG. 4B(2), window 472B includes an instruction for providing a layer of dunnage in the container, and identifies where the dunnage may be located. Additionally, as is shown in FIG. 4B(3) and FIG. 4B(4), window 473B includes an instruction for inserting the item into the container, and window 474B includes an instruction for covering the item with additional dunnage. Finally, as is shown in FIG. 4B(5), window 475B includes an instruction for sealing the container using an adhesive tape, and identifies where the adhesive tape may be located. As is shown in FIG. 4B(6), the container is sealed in accordance with the set of visual instructions 470B. The system 400B may determine that a specific instruction has been executed, and present a subsequent instruction to the worker onto the optical element 452, by any means, such as by recognizing one or more gestures by the worker, e.g., one or more nods, dips, shakes or turns of the head, by sensing manual contact with one or more elements of the augmented reality device 450, or by detecting the presence or absence of one or more essential aspects for the performance of the task within the workstation, i.e., the edges, contours or outlines of an item or a container at the workstation, using one or more imaging devices.

Accordingly, the systems and methods of the present disclosure may be utilized to present computer-based instructions to workers in a convenient format and layout, and in appropriate locations and configurations within a workstation, thereby enabling the workers to perform tasks such as the preparation of items for delivery to customers or other destinations without having to divert their attention from the workstation. Moreover, such instructions may be provided singly or all at once, or in one or more small groups of instructions, as appropriate: although the system 400A of FIG. 4A is shown as projecting an entire set of visual instructions 470A onto the upper surface 432 of the working table 430, and the system 400B of FIGS. 4B(1), 4B(2), 4B(3), 4B(4), 4B(5) and 4B(6) is shown as displaying individual instructions of a set 470B within windows 471B, 472B, 473B, 474B, 475B, the systems and methods disclosed herein are not so limited. For example, the system 400A of FIG. 4A may be adapted to present fewer than all of the visual instructions of the set 470A onto the upper surface 432, while the system 400B of FIGS. 4B(1), 4B(2), 4B(3), 4B(4), 4B(5) and 4B(6) may be configured to display two or more visual instructions of the set 470B within a common window. A determination as to which instructions are to be presented to a worker in groups, and in which locations, may be made on any basis.

For example, the systems and methods of the present disclosure may generate a set of instructions for performing a task based on the locations of materials or supplies that are required in order to complete the task (e.g., containers, dunnage and/or adhesives or other labels for preparing an item for delivery), and present such instructions, either singly or in bulk, to a worker in convenient positions and at appropriate times. For example, where the specific task is related to the preparation of an item for delivery, the instructions may be generated and displayed based on the locations of the materials or the supplies required to execute each of the instructions, as well as any particular requirements or constraints for preparing the item or an order with which the item is associated for delivery.

Figure 5:
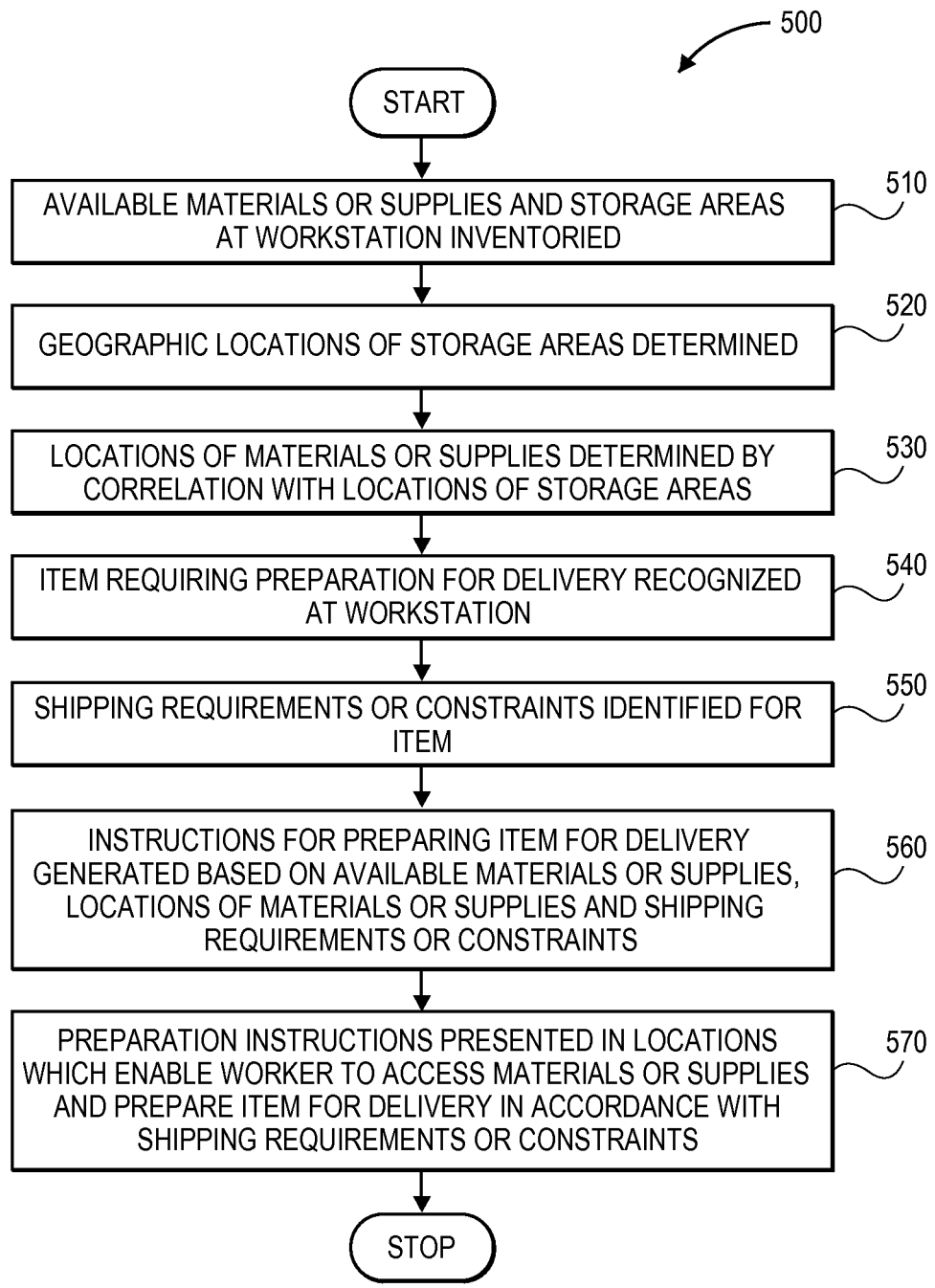
FIG. 5 is a flow chart of one process for evaluating shipments using X-ray imaging, in accordance with embodiments of the present disclosure.

Referring to FIG. 5, a flow chart 500 representing one embodiment of a process for presenting computer-based instructions is shown. At box 510, an inventory of the materials or supplies that are available within a vicinity of a workstation, and the storage areas in which such materials or supplies are stored, is completed. For example, where materials or supplies are identified with regard to numbers or other identifiers of bins, bays, shelves, slots, racks, tiers, bars, hooks, cubbies or other like storage means, the number or amount of such materials or supplies may be determined.

At box 520, the geographic locations of the storage areas or storage facilities in which the materials or supplies are stored in the vicinity of the workstation are determined. Such locations may be determined, for example, by manually or automatically reading a marking, label or other identifier (e.g., a set of text, numerals or other character) on an outer surface of a bin, bay, shelf, slot, rack, tier, bar, hook, cubby or other storage means; by capturing one or more digital images of the respective storage areas or facilities and extrapolating information regarding such locations, e.g., sets of coordinates corresponding to each such area or facility; by resorting to a lookup table or other form of record or index including such information; or by any other means or method. The locations of the areas may be identified according to any form or type of absolute or relative reference system, including coordinates in a Cartesian system (i.e., three-dimensional coordinates x, y, z). At box 530, the available materials or supplies are correlated with the corresponding geographic locations and stored in a record maintained in a database. For example, where a geographic location of a bin containing a specific type of item is identified, the geographic location of the bin is associated with the specific type of item.

At box 540, an item requiring preparation is recognized at the workstation. The item may be scanned, read, weighed or otherwise acknowledged at the workstation by any means or method. At box 550, a set of applicable shipping requirements or constraints for the item, or an order with which the item is associated, is identified. For example, information regarding requirements or constraints for the order may be received in one or more electronic messages or identified in one or more records maintained in a data store. Such information may relate to the destination for the item, or any particular handling requirements or constraints for the item (e.g., any mandatory container or type of dunnage for the item, any specific materials for the item, or whether the item must pass through customs during transit).

At box 560, a set of preparation instructions may be generated based on the available materials or supplies, as well as the shipping requirements or constraints for the item. For example, the set of preparation instructions may identify specific containers, dunnage, labels, adhesives or other materials or supplies based on their particular locations, and also include steps or actions that are required in order to complete such instructions.

At box 570, the system presents the preparation instructions generated at box 560 in one or more convenient locations that enable access to the materials or supplies and provide sufficient working space for preparing the item for delivery, and the process ends. For example, using a system for providing computer-based instructions in accordance with the present disclosure, such as the system 100A of FIG. 1A, a projector may cause a display of one or more instructions on one or more surfaces of the workstation, in locations that may be convenient or appropriate with regard to the particular instructions.

Accordingly, the systems and methods of the present disclosure may provide computer-based instructions to a worker for preparing an item for delivery at a workstation based at least in part on the geographic locations of the materials and/or supplies that are required in order to prepare the item, and in one or more specific locations on the workstation, thereby enabling the worker to prepare the item without diverting his or her attention from the workstation.

Figure 6A:
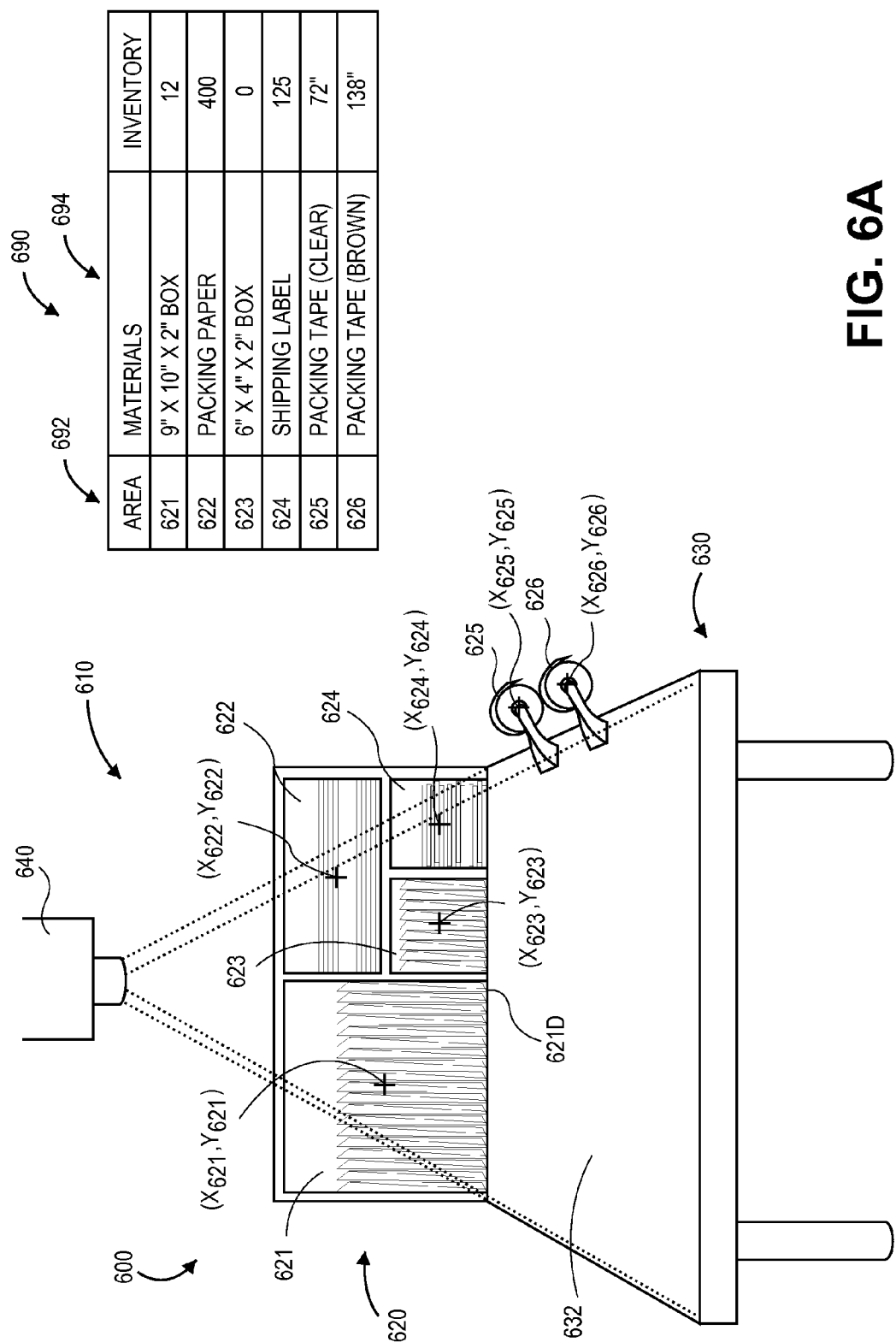
FIGS. 6A, 6B and 6C are views of a system for providing computer-based instructions, in accordance with embodiments of the present disclosure.
Figure 6C:
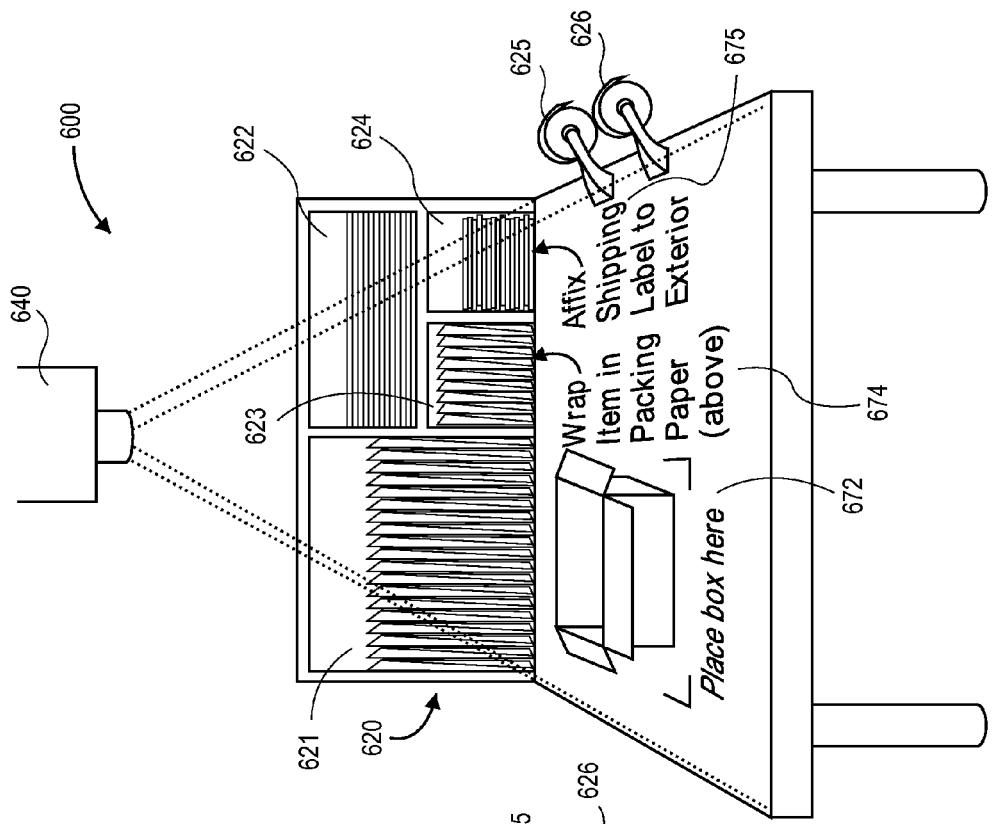
Figure 6B:
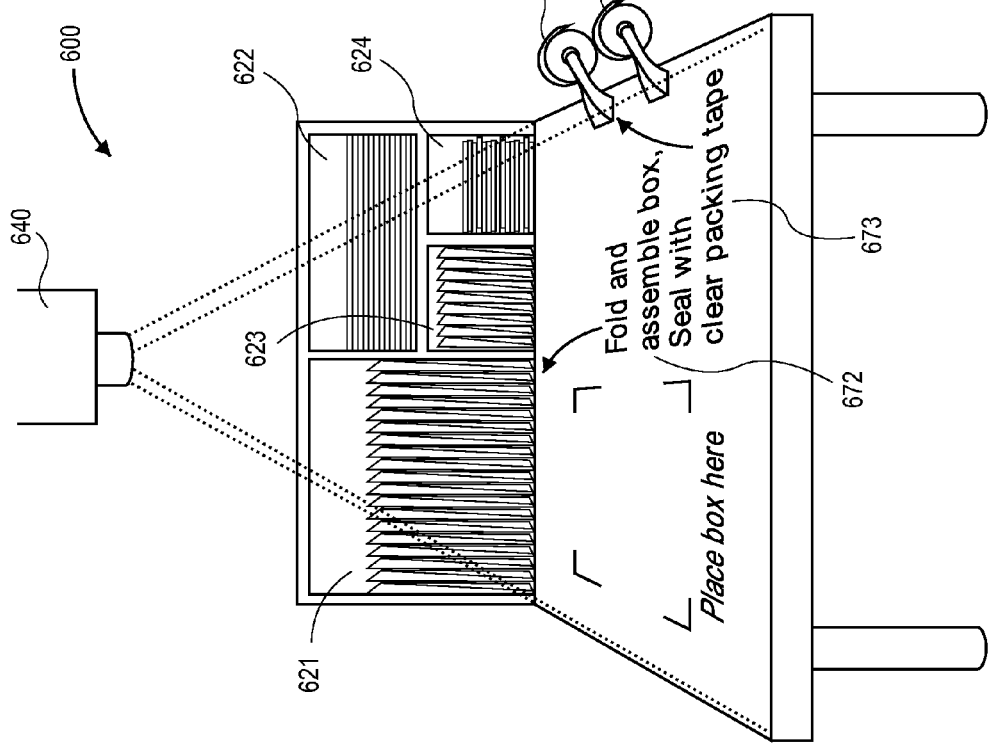

Referring to FIGS. 6A, 6B, 6C, a system 600 for providing computer-based instructions is shown. Except where otherwise noted, reference numerals preceded by the number "6" in FIG. 6A, 6B or 6C indicate components or features that are similar to components or features having reference numerals preceded by the number "4" shown in FIG. 4A, 4B(1), 4B(2), 4B(3), 4B(4), 4B(5) or 4B(6), or by the number "1" shown in FIG. 1A or FIG. 1B. As is shown in FIG. 6A, the system 600 includes a workstation 610 and a table 690 of data regarding materials or supplies available at the workstation 610. The workstation 610 further includes a supply frame 620, a working table 630 and a projector 640 configured above the working table 630.

The supply frame 620 includes a plurality of bins 621, 622, 623, 624 for including containers (e.g., boxes, envelopes, tubes or bags) or dunnage (e.g., paper, plastic, foam materials or "bubble wrap"), as well as mounts 625, 626 for providing supplies such as rolled adhesive tapes or mailing labels. As is shown in FIG. 6A, the bins 621, 622, 623, 624 and mounts 625, 626 each have corresponding locations associated therewith, including coordinates ($x_{621}$, $y_{621}$) corresponding to a location of bin 621, coordinates ($x_{622}$, $y_{622}$) corresponding to a location of bin 622, coordinates ($x_{623}$, $y_{623}$) corresponding to a location of bin 623 and coordinates ($x_{624}$, $y_{624}$) corresponding to a location of bin 624, as well as coordinates ($x_{625}$, $y_{625}$) corresponding to a location of mount 625, and coordinates ($x_{626}$, $y_{626}$) corresponding to a location of mount 626.

As is discussed above, the locations of the bins 621, 622, 623, 624 and the mounts 625, 626 may be associated with the various materials or supplies stored therein or assigned thereto, such as is shown in the table 690. Thus, the locations of the bins 621, 622, 623, 624 and the mounts 625, 626 may serve at least two purposes in accordance with the present disclosure: first, information regarding the locations may be used when generating instructions for the performance of a task, such as the preparation of an item for delivery using materials or supplies stored in such bins or mounts. Second, information regarding the locations may also be used in determining where such instructions should be displayed to a worker.

For example, instructions that are displayed on a surface of a workstation may be shown in a vicinity of relevant materials or supplies that may be required in order to prepare the item in accordance with the instructions, but in a manner that permits a worker to prepare the item while reading and following the instructions. Alternatively, where such instructions are to be provided to a worker by an augmented reality device or other wearable computer system, such as by projecting the instructions upon an optical element 152 of such the device 150 of FIG. 1B, the placement of windows including such instructions may be customized to ensure that such windows are rendered within a vicinity of, but not over, the materials or supplies to which they refer within a field of view of the worker.

Referring to FIGS. 6B and 6C, the system 600 of FIG. 6A is shown with instructions 671, 672, 673, 674, 675 displayed on the upper surface 632 of the working table 630. As is shown in FIG. 6B, the instruction 671 identifies a location where a box prepared in accordance with the instructions 672, 673 may be placed in order to prepare an item for delivery to a customer. As is shown in FIG. 6C, the instruction 674 identifies dunnage (viz., packing paper) to be wrapped around the item, and the instruction 675 identifies a shipping label to be affixed to an exterior surface of the box.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although many of the embodiments described herein or shown in the accompanying figures are described for use in a fulfillment center environment, the systems and methods are not so limited, and may be employed in any environment. Moreover, although many of the embodiments described herein are directed to providing computer-based instructions to workers using computer system components such as projectors or wearable computer devices (e.g., augmented reality glasses), the systems and methods are also not limited. For example, a workspace may be provided with a flat-panel television monitor on a horizontal surface thereof, and instructions may be presented to a worker by way of the television monitor, in one or more specified locations. Furthermore, although much of the present disclosure is providing computer-based instructions to workers for the preparation of items for delivery, the systems and methods are also not so limited, and may be used to provide computer-based instructions for performing any task. For example, the systems and methods disclosed herein may provide instructions for gift-wrapping items, cooking meals in accordance with recipes, for repairing automobiles, or for any other task, in accordance with the systems and methods disclosed herein.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 3A, 3B and 5, the order in which the boxes or steps of the methods or processes are listed is not intended to be construed as a limitation on the claimed inventions, and any number of the boxes or steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or boxes or steps. In a similar manner, terms such as "include," "including" and "includes are generally intended to mean "including, but not limited to." Thus, such conditional language is not generally intended to imply that features, elements and/or boxes or steps are in any way required for one or more embodiments or that one or more embodiments necessarily include logic for deciding, with or without user input or prompting, whether these features, elements and/or boxes or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A wearable computer system comprising:
   an imaging device mounted to a frame;
   an eye-level display device mounted to the frame, wherein the eye-level display device comprises an optical element; and
   a computing device in communication with at least one of the sensor device or the display device,
   wherein the computing device is configured to at least:
      recognize an item at a workstation using the imaging device, wherein the item is within a field of view of the imaging device;
      in response to recognizing the item, determine a shipping requirement for the recognized item;
      identify instructions for preparing the recognized item in accordance with the shipping requirement at the workstation;
      determine locations of a plurality of resources for preparing the recognized item in accordance with the shipping requirement at the workstation;
      select a first position of a first window on the optical element of the eye-level display device based at least in part on a first location of a first resource for preparing the recognized item in accordance with a first instruction, wherein the first resource is not within the field of view of the imaging device; and
      render the first instruction in the first window in the first position on the optical element of the eye-level display device.

2. The wearable computer system of claim 1, wherein the computing device is further configured to at least:
   transmit a request for the instructions for preparing the recognized item to at least one server over a network; and
   receive the instructions for preparing the recognized item from the at least one server over the network,
   wherein the locations of the plurality of resources for preparing the recognized item in accordance with the shipping requirement are determined in response to receiving the instructions for preparing the recognized item in accordance with the shipping requirement.

3. The wearable computer system of claim 1, wherein the computing device is further configured to at least:
   generate the instructions for preparing the recognized item based at least in part on the first location of the first resource at the workstation,
   wherein the instructions are generated in response to determining the locations of the plurality of resources for preparing the recognized item in accordance with the shipping requirement.

4. The wearable computer system of claim 1, wherein the computing device is further configured to at least:
   receive an acknowledgement of a performance of the first instruction;
   select a second position of a second window on the optical element of the eye-level display device based at least in part on a second location of a second resource for preparing the recognized item in accordance with a second instruction, wherein the second resource is not within the field of view of the imaging device; and
   render the second instruction in the second position in the second window on the optical element of the eye-level display device.

5. A method for providing instructions for completing a task at a workstation, the method comprising:
   identifying information regarding the task using at least one computer processor;
   determining at least one requirement for completing the task using the at least one computer processor;
   identifying information regarding at least one resource for completing the task in accordance with the at least one requirement using the at least one computer processor, wherein the information regarding the at least one resource comprises a location of the at least one resource at the workstation;
   generating at least one instruction for completing the task with the at least one resource using the at least one computer processor, wherein the at least one instruction is generated based at least in part on the information regarding the task and the at least one requirement for completing the task; and
   causing information regarding the at least one instruction to be displayed by a wearable computer device, wherein information regarding the at least one instruction comprises at least one identifier of the at least one resource.

6. The method of claim 5, wherein the task comprises preparing an item for delivery at the workstation, and
   wherein identifying the information regarding the task comprises:
   identifying the item in a vicinity of the workstation.

7. The method of claim 6, wherein identifying the item in the vicinity of the workstation comprises at least one of:
   interpreting at least a first identifier on an exterior surface of the item;
   interpreting at least a second identifier on one of a tote associated with the item, a cart associated with the item or a bin associated with the item;
   recognizing at least one of a data transfer device associated with the item or a vehicle associated with the item;
   determining a mass of the item; or receiving a message comprising the information regarding the item.

8. The method of claim 6, wherein identifying the information regarding the task comprises:
    identifying a destination for the item; or
    identifying an order including the item.

9. The method of claim 6, wherein identifying the information regarding the at least one resource for completing the task in accordance with the at least one requirement comprises:
    determining an inventory of a plurality of resources available at the workstation using the at least one computer processor, wherein the plurality of resources comprises the at least one resource.

10. The method of claim 9, further comprising:
    determining a location of at least some of the plurality of resources available at the workstation, wherein the at least some of the plurality of resources comprises the at least one resource.

11. The method of claim 5, wherein the at least one resource is one of a container, a type of dunnage, a label or an adhesive.

12. The method of claim 6, wherein the at least one requirement for completing the task at the workstation is determined based on at least one attribute of the item.

13. The method of claim 6, wherein generating the at least one instruction for completing the task at the workstation with the at least one resource comprises:
    generating a plurality of instructions for preparing the item for delivery with the at least one resource, wherein the plurality of instructions comprises the at least one instruction.

14. The method of claim 13, wherein the at least one instruction comprises at least one of:
    an instruction intrinsic to the item;
    an instruction for preparing a container;
    an instruction for providing dunnage in the container;
    an instruction for placing the item in the container;
    an instruction for sealing the container; or
    an instruction for causing a delivery of the container to a destination.

15. The method of claim 13, wherein causing the information regarding the at least one instruction to be displayed by the wearable computer device comprises:
    projecting the at least one instruction into a field of view of a user of the wearable computer device.

16. The method of claim 13, wherein causing the information regarding the at least one instruction to be displayed by the wearable computer device comprises:
    projecting a first instruction into a field of view of a user of the wearable computer device, wherein the first instruction is one of the plurality of instructions;
    receiving an acknowledgment of the performance of the first instruction from the user; and
    projecting a second instruction into the field of view of the user of the wearable computer device, wherein the second instruction is one of the plurality of instructions.

17. The method of claim 5, wherein the information regarding the at least one identifier is a visual reference to the location of the at least one resource at the workstation.

18. The method of claim 17, wherein the visual reference virtually points in a direction of the location of the at least one resource at the workstation.

19. A method comprising:
    identifying an item to be prepared for delivery to a destination by at least one computer processor;
    determining at least one attribute of the item by the at least one computer processor;
    determining a location of at least one resource for preparing the item for delivery at a workstation by the at least one computer processor;
    generating at least one process step for preparing the item for delivery at the workstation with the at least one resource by the at least one computer processor, wherein the at least one process step is generated based at least in part on the at least one attribute of the item; and
    causing a display of information regarding the at least one process step for preparing the item for delivery onto an optical element of a wearable computer device,
    wherein the information regarding the at least one process step comprises a visual reference to the location of the at least one resource.

20. The method of claim 19, wherein the at least one attribute is one of a dimension of the item, a mass of the item, a source of the item or a destination for the item.

21. The method of claim 20, wherein the at least one resource is one of a container, a type of dunnage to be included in the container, an order description to be included in the container, a gift card to be included in the container, an adhesive for sealing the container or a label to be affixed to the container.

22. The method of claim 19, further comprising:
    selecting a position for the display of the information regarding the at least one process step for preparing the item onto the optical element based at least in part on the location of the at least one resource; and
    causing the display of the information regarding the at least one process step for preparing the item in the selected position.

* * * * *